United States Patent
Farooq

(10) Patent No.: US 12,298,994 B2
(45) Date of Patent: May 13, 2025

(54) RAW/SANITIZED DATA MODELING

(71) Applicant: DISH WIRELESS L.L.C., Englewood, CO (US)

(72) Inventor: Babur Farooq, Brooklyn, NY (US)

(73) Assignee: DISH WIRELESS L.L.C., Englewood, CO (US)

( * ) Notice: Subject to any disclaimer, the term of this patent is extended or adjusted under 35 U.S.C. 154(b) by 0 days.

(21) Appl. No.: 18/219,510

(22) Filed: Jul. 7, 2023

(65) Prior Publication Data
US 2025/0013657 A1  Jan. 9, 2025

(51) Int. Cl.
*G06F 16/215* (2019.01)
*G06F 16/25* (2019.01)

(52) U.S. Cl.
CPC .......... *G06F 16/254* (2019.01); *G06F 16/215* (2019.01)

(58) Field of Classification Search
None
See application file for complete search history.

(56) References Cited

U.S. PATENT DOCUMENTS

| | | | |
|---|---|---|---|
| 11,888,701 B1 * | 1/2024 | Liu | H04L 41/12 |
| 2022/0060520 A1 | 2/2022 | Carney Landow et al. | |
| 2022/0303886 A1 | 9/2022 | Theimer et al. | |
| 2022/0345913 A1 | 10/2022 | Al-Dulaimi et al. | |
| 2023/0100729 A1 * | 3/2023 | Kostic | H04L 47/745 370/230 |
| 2023/0107631 A1 | 4/2023 | Chenumolu et al. | |
| 2023/0239684 A1 | 7/2023 | Sevindik | |
| 2023/0394168 A1 * | 12/2023 | Chintalapati | G06F 40/284 |
| 2024/0015569 A1 * | 1/2024 | Doostnejad | H04W 24/04 |
| 2024/0064536 A1 * | 2/2024 | Mathews | H04L 41/147 |
| 2024/0114070 A1 | 4/2024 | Krasilnikov et al. | |

FOREIGN PATENT DOCUMENTS

| | | |
|---|---|---|
| WO | 2022/238161 A1 | 11/2022 |
| WO | 2023/059776 A1 | 4/2023 |
| WO | 2023/167964 A1 | 9/2023 |

* cited by examiner

*Primary Examiner* — Scott A. Waldron
(74) *Attorney, Agent, or Firm* — Seed IP Law Group LLP

(57) ABSTRACT

A cellular network having radio access network (RAN) nodes where each RAN node includes (i) a central unit (CU) that resides on a public cloud of the cellular network, (ii) a distributed unit (DU) that resides on a private cloud of the cellular network such that the DU is in communication with the CU on the public cloud of the cellular network, and (iii) a radio unit (RU) under control of the DU. The cellular network also has network repository functions (NRFs) that are distributed on the cellular network and reside on at least the public cloud of the cellular network where the NRFs control operation of cell sites and local data centers (LDCs) on the cellular network. The network also has processors configured to control data collection edge applications residing with the NRFs that are distributed on the cellular network.

20 Claims, 15 Drawing Sheets

RAW/SANITIZED DATA MODELING

BACKGROUND

Demand for mobile bandwidth continues to grow as customers access new services and applications. To remain competitive, telecommunications companies are cost-effectively expanding their networks while also improving user experience.

Radio access networks (RANs) are an important element in mobile cellular communication networks. However, they often require specialized hardware and software that requires extensive observability to monitor, collect, and store data in order to ensure the systems are running properly and efficiently.

SUMMARY

As telecom networks expand, collecting and managing operating data of cell sites on the networks becomes exponentially more difficult. Embodiments of the present application consider ways to reduce the amount of data while simultaneously increasing its readability.

In particular, the amount of data received by a cell site can vary significantly depending on various factors such as the number of active users, the types of services being used (voice calls, text messages, internet browsing, video streaming, etc.), and the overall network usage in a particular area. On average, a cell site can handle several terabytes (TB) of data per day. Utilizing advanced analytics and machine learning algorithms, embodiments herein can extract valuable insights from large data sets without storing all the raw data. Aggregated or processed data can be used to derive meaningful information while reducing storage requirements.

Embodiments of the present application include a cellular network having radio access network (RAN) nodes where each RAN node includes (i) a central unit (CU) that resides on a public cloud of the cellular network, (ii) a distributed unit (DU) that resides on a private cloud of the cellular network such that the DU is in communication with the CU on the public cloud of the cellular network, and (iii) a radio unit (RU) under control of the DU. The cellular network also has network repository functions (NRFs) that are distributed on the cellular network and reside on at least the public cloud of the cellular network where the NRFs control operation of cell sites and local data centers (LDCs) on the cellular network. The network also has processors configured to control data collection edge applications residing with the NRFs to: receive operating data of at least one cell site or LDC from the at least one NRF; store the operating data in a memory; correct errors in the operating data to obtain corrected operating data; filter the corrected operating data to obtain filtered operating data; format the filtered operating data to obtain formatted operating data; and send the formatted operating data to one or more data collection agents configured to receive the formatted operating data from the data collection edge applications.

Embodiments of the present application include a method of collecting operating data on a cellular network using processors configured to control data collection edge applications residing with network repository functions (NRFs), including: receiving operating data from NRFs at data collection edge applications residing with the NRFs, where the NRFs are distributed on the cellular network such that the NRFs reside on at least a public cloud of the cellular network and the NRFs control operation of cell sites and local data centers (LDCs) on the cellular network; storing the operating data in a memory; correcting errors in the operating data to obtain corrected operating data; filtering the corrected operating data to obtain filtered operating data; formatting the filtered operating data to obtain formatted operating data; and sending the formatted operating data to data collection agents on the cellular network that are configured to receive the formatted operating data from the data collection edge applications. The cellular network has radio access network (RAN) nodes where each RAN mode includes (i) a central unit (CU) that resides on the public cloud of the cellular network, (ii) a distributed unit (DU) that resides on a private cloud of the cellular network such that the DU is in communication with the CU on public cloud of the cellular network, and (iii) a radio unit (RU) under control of the DU.

In some embodiments, operating data is received from the at least one NRF at regular intervals. In some embodiments, the filtering includes removing duplicative information from the operating data. In some embodiments, the filtering further includes: determining if any of the operating data is immaterial based on a predetermined classification; and removing the immaterial operating data. In some embodiments, the formatting includes removing rows and columns from the filtered operating data. In some embodiments, filtering includes removing sensitive information from the corrected operating data. In some embodiments, the sensitive information includes personal identifying information. In some embodiments, the data collection edge applications operate on the cell sites, and the memory is located at the cell sites or the LDCs. In some embodiments, each data collection agent is exclusively associated with each respective NRF. In some embodiments, an artificial intelligence cellular communication management program controlling the RAN nodes adjusts its operational parameters using models of predicted network failures, the models having been developed based on the formatted operating data.

DETAILED DESCRIPTION OF EMBODIMENTS

Figure 1:
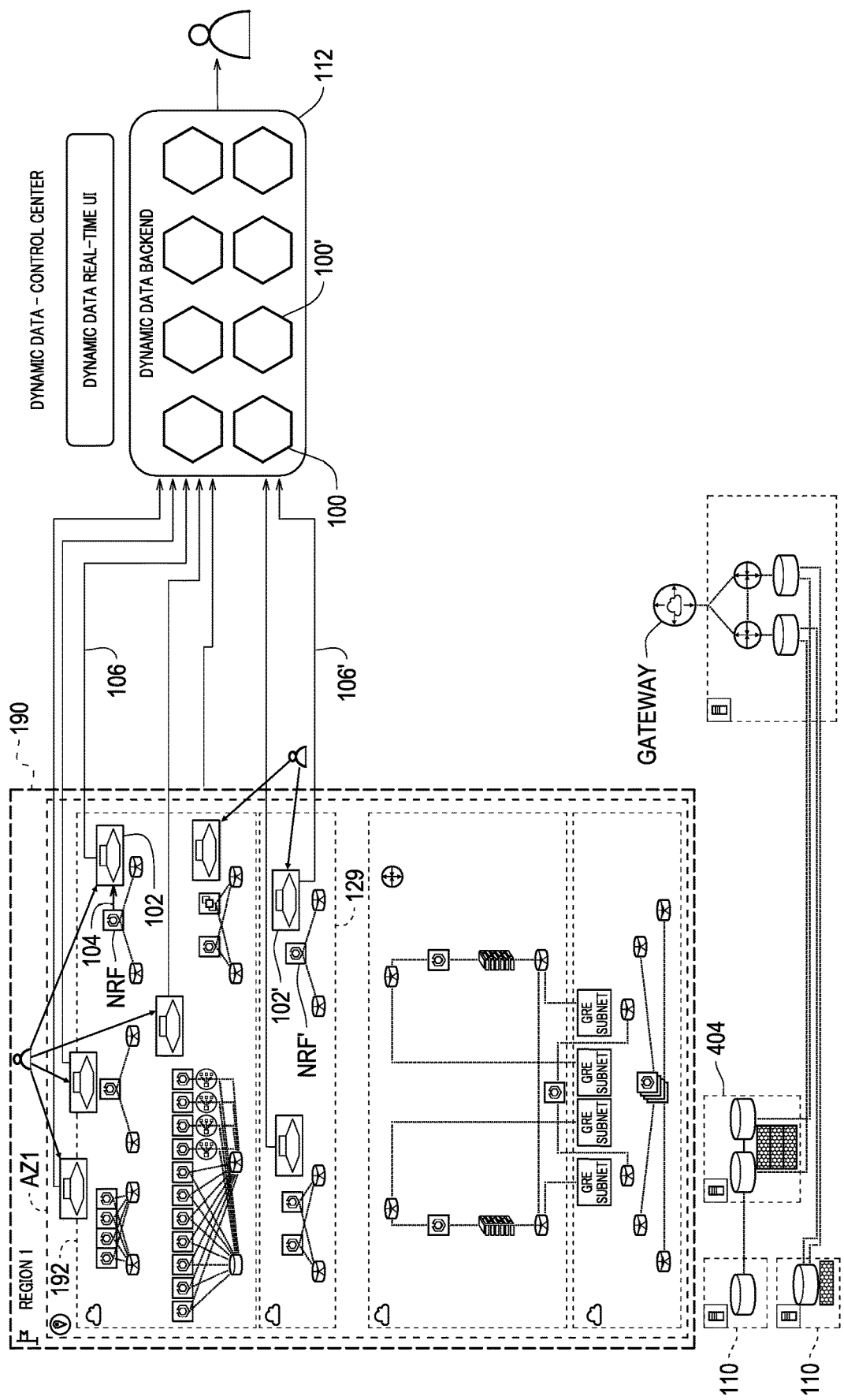
FIG. 1 illustrates a block diagram of an overall architecture of the clusters and monitoring software operating on a public network and a private network, according to various embodiments.
Figure 2:
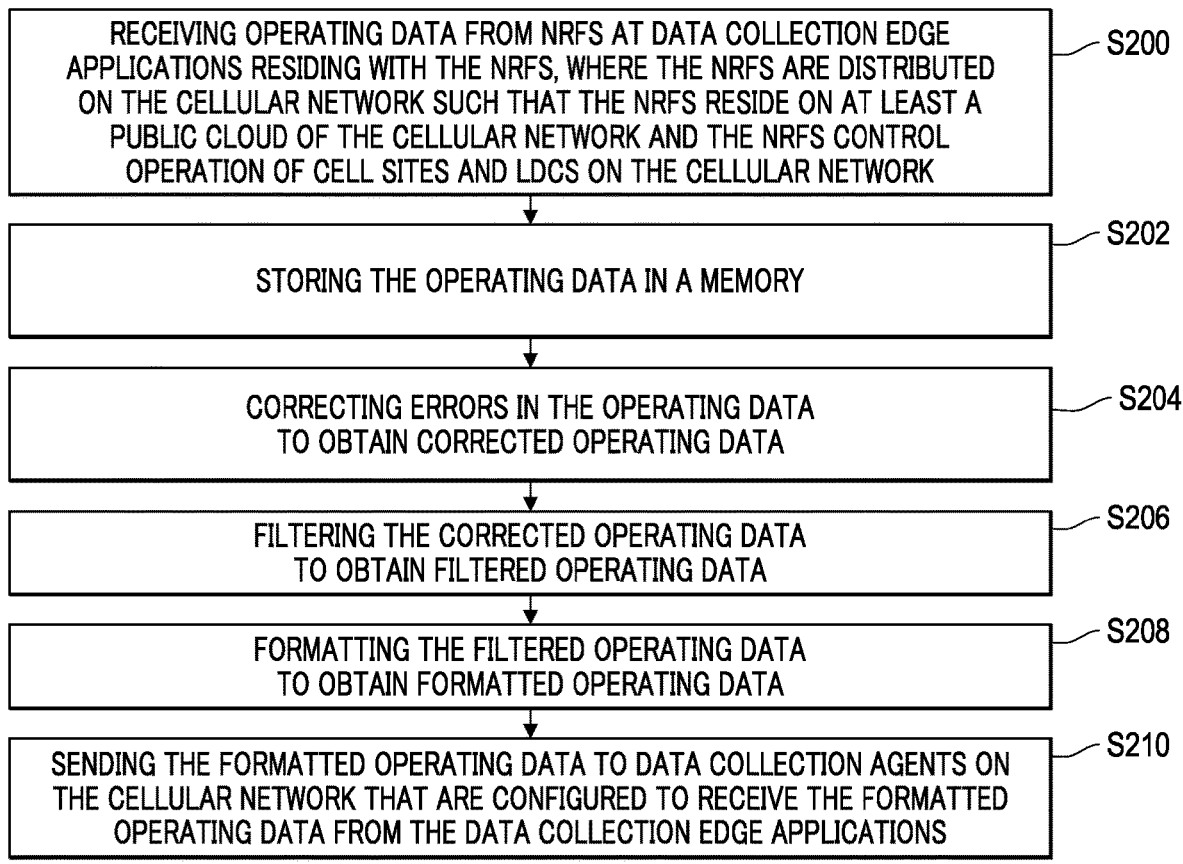
FIG. 2 illustrates a method according to embodiments.

The present disclosure is focused on software for accurate inventorying of hardware and software resources on a cellular communication network. This inventorying software is shown in FIGS. 1 and 2 and described immediately below. The hardware and software architectures of the cellular communications network are shown in FIGS. 3-15, and described in detail further below.

Maintaining an accurate and up-to-date network inventory is a difficult problem. Even if the complex initial architecture of the network is fully known, available resources change with usage and hardware/software failures. Embodiments herein seek to provide more accurate and real-time information concerning available network resources.

There is such a thing as a "black box" type approach having various propriety interfaces and storing data at the vendor locations, different databases and at different server locations and networks. Embodiments herein require different EMS (Element Management System) systems and are managed by different entities.

On the other hand, certain embodiments use multiple systems, which are making different systems or layers, including the observability framework (OBF) layer, a centralized configuration management, and the inventory or storage layer, which are described in detail further below. These approaches are all appropriate for managing a cloud-based cellular network. Software can interface with these different architectures to inventory network resources, as described further below.

Software Configuration of Network Data Collectors

The software herein includes tools for working with raw/sanitized data so as to perform data modeling and apply data ontology. Ontology connects everything from a data source down to the model. All data lineage can be catalogued and the interconnectivity of data sources can also be catalogued. Edge ontology can also be implemented. Here, Artificial Intelligence (AI) and models are deployed at the edge/boundaries of the network (i.e. at cell sites on the edge of the network) to get logs and information. This can be custom tailored to the cloud implementation. Ontology means bringing things from real world into the computer world (i.e. collecting data concerning a real-world object). The real world object in this case would be the cell site, and its relationship with other components of the cellular network.

Network data collectors are used in several embodiments for accurate inventorying. FIG. 1 shows a software configuration of network data collectors. As can be seen in FIG. 1, the data collectors are comprised of data collection agents 100, 100' and data collection edge applications 102, 102'. The data collection edge applications 102, 102' operate in virtualized central unit (vCU) 555 (as further described in FIG. 6), and collect large volumes of operating data on cell sites. The vCU is in charge of operating the cell sites that provide cellular data connectivity. Therefore, by collecting operating data from the vCU, resources relevant to providing cellular data services are inventoried. This operating data is stored in logs by the computers operating the data collection edge applications 102, 102'.

In a cellular network implemented using cloud servers, cell site operations are controlled at the "edge" of the network (i.e. at cell sites). The cell site operating data is generated at the cell site (i.e. at the "edge"). In this situation, it is difficult to transfer data from the "edge" of the network to the "core" of the network for modeling and analysis. Doing so places a burden on network resources. Thus, sanitizing the data at the "edge" of the network or at the cell site is advantageous because it: 1) reduces data size for transfer; and 2) prepares the data to be used for modeling.

The data collection edge applications 102, 102' regularly receive data from a Network Repository Function (NRF) operating on the NDC 192 or the RDC 129 (along with vCU 555). These NRFs control the operation of the cell sites 110 on the cellular network. These data can be received at regular intervals of e.g. 500 milliseconds to 1 minute, 10-30 seconds, or 15 seconds. The NRF is programmed to send raw data 104 to the data collection edge applications 102. This data 104 may contain the operating data of one or more cell sites 110 (shown in detail in FIG. 13) being managed by the NRF.

The volume of the raw data is often too large to either transfer over the network or analyze centrally. For example, one cell site can produce a terabyte or more of data every day, and there can be 20,000 or more cell sites on a cellular network. Thus, this raw data should be sanitized before it is centrally collected and analyzed. Accordingly, the data collection edge applications 102 have sanitizing functions, including filtering, correcting, and formatting the raw data. Thus, the data collection edge applications 102 can operate directly on the cell site.

By deploying machine learning models directly on edge applications and the devices operating the edge applications (i.e. LDCs or cell sites), data can remain localized, ensuring privacy and security. The edge applications and tracking agents can extract valuable information from a large-scale dataset consisting of cell site Configuration Management (CM), Performance Management (PM), Inventory Management (IM), and Fault Management (FM) data. This large-scale data set can be processed to obtain useful information and minimize data size.

The filtering function of filtering the operating data log to creates a filtered data set. In the filtering of data, data collection edge applications 102 remove duplicative data, erroneous data, sensitive data, and immaterial data. This sensitive data can include personal identifying information (e.g. name, address, social security number; IP address, device unique identifier).

The immaterial data is data that is determined to be unimportant due to belonging to a classification that is previously identified as immaterial. For example, the data collection edge application could determine that all cell phone unique identifier data is immaterial, and remove that data from its operating data as part of the filtering. This filtered data set is smaller and contains less unimportant information. The data classes which are deemed to be immaterial may be set in advance by a network operator or software developer. These data classes may change over time in response to the analytical behavior of the network manager. For instance, if a certain class of data is never useful for improving network performance, it can be classified as immaterial for future data collections.

As noted above, erroneous data can be simply removed as part of the filtering process. Errors in the data can be corrected or removed in part of a data correction process. As part of this process, errors are identified in the data. This can be done by reading a pre-existing error tag that has been placed by software or an administrator. Alternatively, the data collection edge applications 102 can identify data errors as part of the data correction process. For example, certain data patterns associated with errors can be identified in advance and searched for in the data correction process. Alternatively, if the data collection edge applications 102 are unable to process a portion of the data, that portion can be identified as erroneous and removed or corrected. To correct the data, the erroneous data is removed and replaced with non-erroneous data. The non-erroneous data can be calculated in the data correction process or copied from stored data.

After filtering and correction, the data collection edge applications 102 format the filtered operating data to be recognized by the data collection agents 100 and/or the artificial intelligence cellular communication management program. In some embodiments, formatting includes removing rows and columns from data. In these situations, the data aggregator may be better able to process linear data over tabulated data. Another reason to remove rows/columns is to reduce the size of the data to facilitate easier and faster transmittal to the data aggregator. The formatted operating data 106 is then sent to the data collection agents (i.e. data aggregator) 100 for further analysis and use.

The data collection agents 100, 100' can operate independently of the network controller, or be integrated with it. In embodiments where the data collection agents 100, 100' operate separately from the network controller, resources of the computer network are preserved. In other words, the inventory monitoring functions of the data collection agents 100, 100' will not consume resources dedicated to providing telecommunications connectivity to users.

The data collection agents 100, 100' use the operating data to improve the functioning of the network and to can also perform inventorying of network resources. For example, the network controller can feed the operating data into a machine learning algorithm in order to adjust operational parameters of the network. In such a context, the operating data can be used as training data for the machine learning algorithm. Proposed changes to network operational parameters that result in favorable outcomes are positively reinforced by a human operator or the software. The network resources include all network functions and associated things in their cluster and virtual private cloud (VPC). Any resources that are running in a particular cluster will be tracked and considered as inventory.

For example, the data can be used to build models that predict network failures. This can be done using the machine learning or AI software mentioned herein. In other words, the operating data can evidence a set of conditions or patterns that repeatedly result in network failures. These conditions or patterns can be used to predict future failures.

It is important when doing this modeling and prediction that they filtering, correcting, and formatting processes do not alter the data in such a way as to present a false picture of the network operation. It is possible to alter the modeling/prediction outcomes by improperly sanitizing the data used in the modeling or prediction. For example, the data correction process could remove useful failure-related information by correcting data errors. Some information is also inherently lost in the data formatting process. This information could be useful for fully understanding network operations. Thus, it is important to calibrate the sanitizing processes to avoid the loss of diagnostic or other useful information.

It is also advantageous to inventory network resources beyond the server level, and determine what resources are actually available inside each server and software module. For example, the exact amount of memory, processor, and network communications bandwidth available in each server can be logged by the data collection agents 100, 100'. Moreover, the operable functions of each NRF can be accurately logged. Thus, the data collection agents 100, 100' and/or network controller adjust their inventory information based on the operating data received from the data collection edge applications.

By having the edge applications 102, 102' sanitize the operating data before sending it to the collection agents 100, 100', the size of data to be transferred over the network is reduced. Moreover, the data is made easier to process and analyze by collection agents 100, 100' and network controller 112. These processes and analysis can include inventorying or gaining insights about network operations to predict future network behavior.

The network software/edge applications can collectively train models on distributed data from multiple cell sites, extracting valuable insights while respecting privacy regulations and minimizing data breach risks. Model synchronization and network coordination between different edge applications 102, 102' is also possible.

Cluster Operation on Private and Public Networks

In some embodiments, containerized applications such as Kubernetes clusters are used in 5G to stretch a private cloud network (i.e. LDC 404) to/from a public cloud network (i.e. RDC 129 or NDC 192). Each of the clusters in a private network is controlled by master nodes and support functions (e.g. MTCIL) that are run in the public cloud network. The NRFs operate in association with, or as a component of the MTCIL, and sometimes the clusters.

Also, a virtualization platform runs the core and software across multiple geographic availability zones. A data center within the public network/cloud stretches across multiple availability zones ("AZs") in a public network to host: (1) stack management and automation solutions (e.g. the automation platform module, the virtual module, etc.) and (2) Kubernetes cluster management module and the control plane for the RAN clusters. If one of the availability zones fails, another of the availability zones takes over, thereby reducing outages. More details are presented below of this concept.

A private network (sometimes referred to as a local data center) may reside on an organization's own infrastructure, and is typically firewall protected and physically secured. An organization may create a private network by creating an on-premises infrastructure, which can include servers, towers, RRUs, and various software, such as DUs. Private networks are supported, managed, and eventually upgraded or replaced by the organization. Since private clouds are typically owned by the organization, there is no sharing of infrastructure, no multi-tenancy issues, and zero latency for local applications and users. To connect to the private network, a user's device must be authenticated, such as by using a pre-authentication key, authentication software, authentication handshaking, and the like.

Public networks alleviate the responsibility for management of the infrastructure since they are by definition hosted by a public network provider such as AWS, Azure, or Google Cloud. In an infrastructure-as-a-service (IaaS) public network deployment, enterprise data and application code reside on the public network provider servers. Although the physical security of hyperscale public network providers (such as AWS) is unmatched, there is a shared responsibility model that may have organizations that subscribe to those public network services to ensure their applications and network are secure, for example, by monitoring packets for malware or providing encryption of data at rest and in motion.

Public networks are shared, on-demand infrastructure and resources delivered by a third-party provider. In a public network deployment the organization utilizes one or more types of cloud services such as software-as-a-service (SaaS), platform-as-a-service (PaaS) or IaaS from public providers, without relying to any degree on private cloud (on-premises) infrastructure.

A private network is a dedicated, on-demand infrastructure and resources that are owned by the user organization. Users may access private network resources over a private network or VPN; external users may access the organization's IT resources via a web interface over the public network. Operating a large datacenter as a private network can deliver many benefits of a public network, especially for large organizations.

In its simplest form, a private network is a service that is completely controlled by a single organization and not shared with other organizations, while a public network is a subscription service that is also offered to any and all customers who want similar services.

Regardless, because cellular networks are private networks run by a cellular provider, and the control of the containerized applications (e.g. Kubernetes clusters) and the control plane should be on a public network which has more processing power and space, the containerized applications (e.g., Kubernetes clusters) often originate on the public network and extend or "stretch" to the private network. All of these resources should be actively inventoried so that their resources can be fully exploited to provide cellular bandwidth.

In embodiments herein, data collection edge applications 102, 102' operate on both public and private networks. In other embodiments, the data collection edge applications 102, 102' operate on different parts of the public network. For example, the collection agents (i.e. collection software) 100, 100' receive the data from the first edge application 102 (operating on NDC 192) and the second edge application 102' (operating on RDC 129). This data is harvested by a tracking agent operating on a separate server (i.e. the tracking server or tracking software) outside of the private cloud network and the public cloud network. As noted above, when the kubernetes cluster is stretched, different network functions or NRFs are operating on each of the public and private networks. It is possible according to embodiments herein to separately monitor and inventory these functions.

Method of Controlling a Plurality of Cellular Communication Servers

FIG. 2 shows a method according to embodiments herein of controlling a plurality of cellular communication servers. The cellular communication servers can be controlled with respect to ongoing data collection and sanitization. The method may control the plurality of cellular communication servers via at least one processor of the cellular base station or the cloud network executing instructions. The processor may be a hardware processor that may include a central processing unit (CPU), circuitry, and/or other hardware, and may be a component or subcomponent, or in communication with, one or more of the controllers described with respect to cell tower 511a described in FIGS. 7 and 8 and the like.

Figure 6:
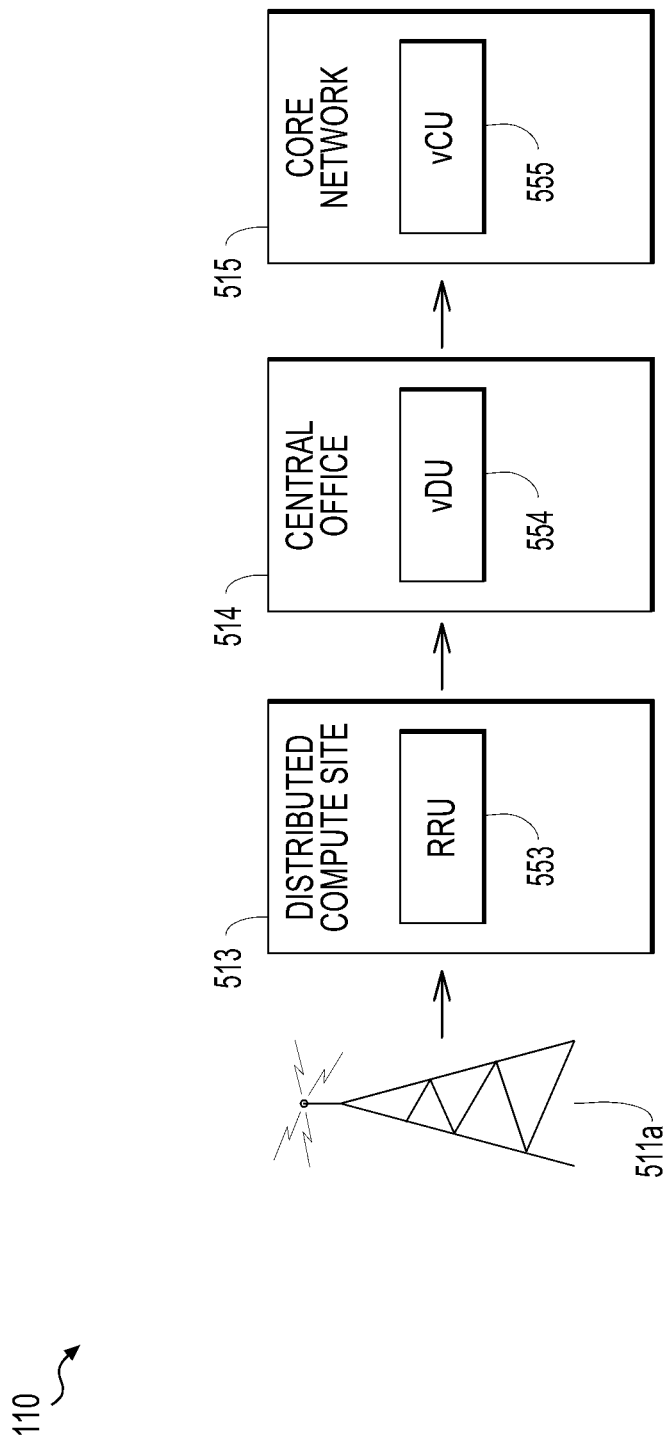
FIG. 6 illustrates a high level block diagram of a cellular network using a remote radio unit, a virtualized distributed unit and a virtualized centralized unit according to some embodiments.
Figure 9:
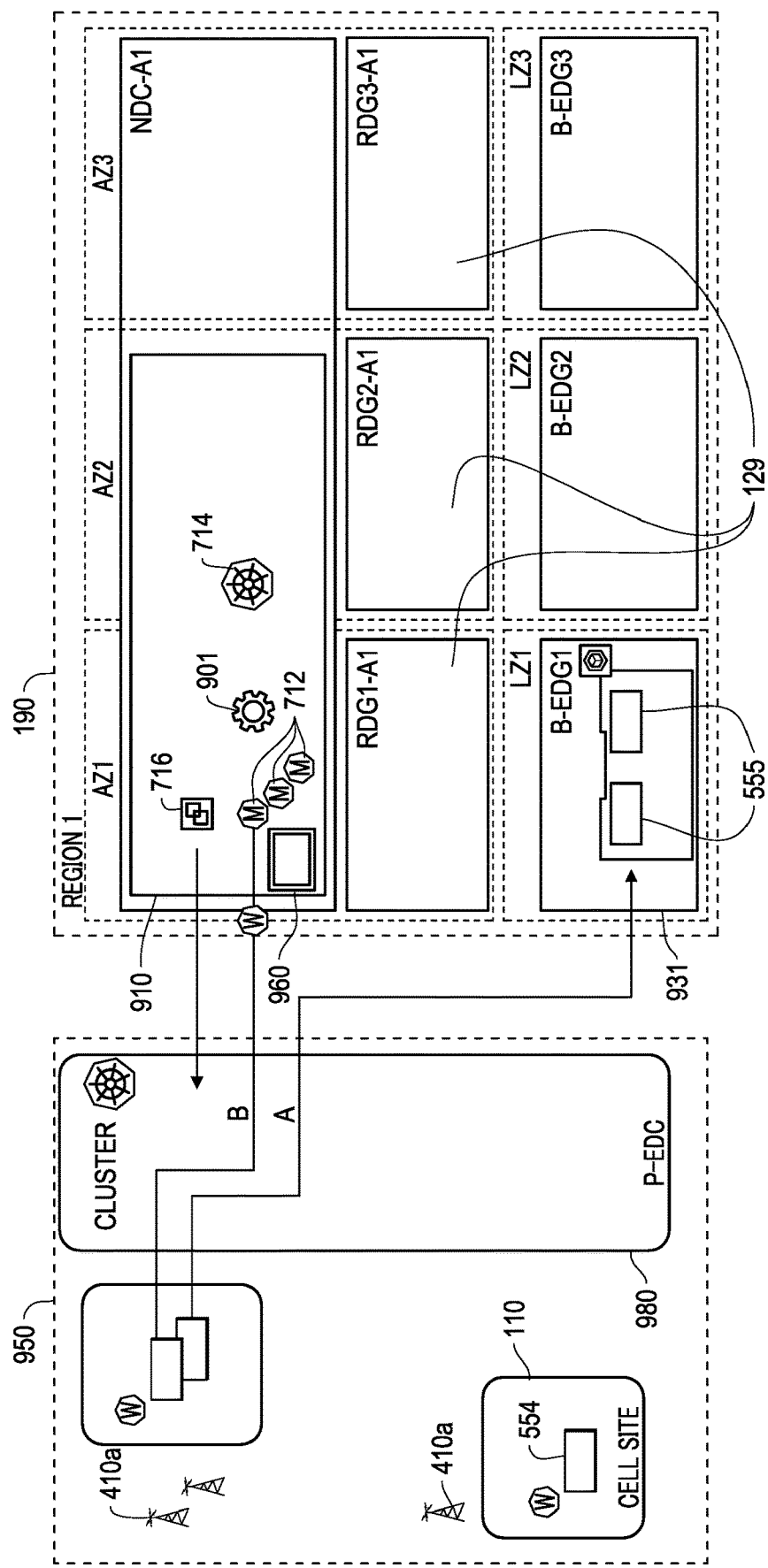
FIG. 9 illustrates a block diagram of stretching the clusters from a public network to a private network, according to various embodiments.

The processor may also be a hardware processor that may be a component or subcomponent, or in communication with, one or more of the vDU 554 or virtualized central unit (vCU) 555, as described in FIGS. 6 and 9, and the like.

In some embodiments, a cellular provider or other entity installs an artificial intelligence cellular base station management program on a cloud computing network. The cloud computing network as described heretofore. The artificial intelligence cellular base station management program is configured to monitor the cellular base station and evaluate a usage amount of the cellular base station. The network also includes edge software that operates on the edge of the network. The edge of the network constitutes servers and network functions (virtual or hardware) that are directly charged with controlling a cell site. The edge software may operate on vDU 554 or in cell tower 511a. In some embodiments, the edge software is operating on the same server as the kubernetes cluster servicing one or more cellular base stations.

There are advantages to operating data collection and sanitization software on the edge of the network. The end result is that data collection functions are distributed over a large number of servers. Thus, much more computing power is harnessed without the need for an additional central server. More data about the network can be collected with this decentralized approach. Moreover, the edge applications perform sanitization of data before it is inventoried or analyzed.

Step S200 includes receiving operating data from NRFs at data collection edge applications residing with the NRFs, where the NRFs are distributed on the cellular network such that the NRFs reside on at least a public cloud of the cellular network and the NRFs control operation of cell sites and LDCs on the cellular network. This may be performed by the hardware processor of the cellular base station, by way of the processor executing instructions to perform the receiving. The processor may be located remote from the cellular base station, or may be at the cell site 110. The processor may also be located at vDU 554 or vCU 555, and may be edge software.

In step S200, the processors execute instructions to receive data from one of the plurality of cellular communication servers. In some embodiments, this is done at regular time intervals. The processor can make an intelligent determination of which servers or NRFs to monitor more closely, based on which areas of the network are the most dynamic. For example, the processor can run an AI algorithm to determine which servers are the most active or vary the most over time.

In step S202, after receiving the data, the processors store the operating data in a memory (usually operating on the same server). Once stored in the memory, the operating data can be sanitized.

In step S204, the processors correct errors in the operating data to obtain corrected operating data. As noted above, errors in the data can be corrected or removed in this process. Errors are identified in the data by reading a pre-existing error tag that has been placed by software or an administrator. Alternatively, the process itself can recognize errors. For example, certain data patterns associated with errors can be identified in advance and searched for in the data correction process. Alternatively, if the processors are unable to process a portion of the data, that portion can be identified as erroneous and removed or corrected. To correct the data, the erroneous data is removed and replaced with non-erroneous data. The non-erroneous data can be calculated in the data correction process or copied from stored data.

In step S206, the processors filter the corrected operating data to prepare filtered operating data. In some embodiments, the filtering in S206 includes determining if any of the operating data is immaterial or sensitive based on a predetermined classification, and removing the immaterial or sensitive operating data. The immaterial data is data that is determined to be unimportant due to belonging to a classification that is previously identified as immaterial. For example, the data collection edge application could determine that all cell phone unique identifier data is immaterial or sensitive, and remove that data from its operating data as part of the filtering.

In step S208, the processors format the filtered operating data to be recognized by data collecting (i.e. data aggregating) or controlling software, such as a data collecting agent or an artificial intelligence cellular communication management program operating on the cloud computing network. In some embodiments, formatting includes removing rows and columns from data. In these situations, the data aggregator may be better able to process linear data over tabulated data. Another reason to remove rows/columns is to reduce the size of the data to facilitate easier and faster transmittal to the data aggregator.

In step S210, the processors send the formatted operating data to the data collection agents or artificial intelligence cellular communication management program. At this stage (after sanitization steps S204-S208), the data may be recognizable by an artificial intelligence cellular base station management program or data collection agents 100 (identified above) that operate on the cloud computing network described heretofore.

The sanitized data can include inventory information of the software or hardware sender. Such inventory information can include available resources or usage amount of the sender. In a case where the sender is associated with a cell, the usage amount may be one or more of a number of users within the cell controlled by the cellular base station, or a data transmission amount in the cell.

In some embodiments, operational parameters of the artificial intelligence cellular base station management program using machine learning may be adjusted. This can be done before or after the artificial intelligence cellular base station management program is installed on the cloud computing network. For example, the machine learning adjustments could be performed prior to installation by operating the management program on a simulated network. The adjustments could be performed after installation by performing machine learning in real-time, so that the management program becomes more efficient over time. A more efficient cellular network provides greater coverage and/or reduced resource consumption given equal operating conditions. The sanitized data can be used as the training data for such modeling programs.

As noted above, the modeling occurs using the sanitized data. This sanitized data can include things like traffic, power consumption, number of users, capacity levels, and other parameters of cellular network operation. The improvements to the network made by the modeling include calibrating the network operating parameters to provide more computer and/or network resources at the appropriate times.

In some embodiments, separate edge applications 102, 102' (see FIG. 1) operate on the NDC 192, and RDC 129, respectively. In this way, the edge applications 102, 102' are distributed throughout the network. In some embodiments, there is a pipeline between the separate edge applications 102, 102' so that they can directly communicate. In FIG. 1, the edge applications 102, 102' separately communicate to the tracking agents 100, 100'. Each separate edge application 102, 102' can separately perform data sanitization before sending the operating data to tracking agents 100, 100'.

For example, the system could operate a first edge application 102 associated with a first NRF operating on a national data center 192 of the cloud computing network 190, the first edge application 102 sanitizing first operating data 106 and sending it to data collection software 100. In this same example, the system could operate a second edge application 102' associated with a second NRF' operating on a regional data center 129 of the cloud computing network 190, the second edge application 102' sanitizing the second operating data 106' and sending it to data collection software 100'.

In embodiments herein, the tracking agents (i.e. tracking software) 100 receive the data from the first edge application 102 and the second edge application 102'. In some embodiments, a first tracking agent 100 and a second tracking agent 100' separately receive data from the first edge application 102 and the second edge application 102', respectively. A controller 112 controls the first tracking agent 100 and second tracking agent 100' and can assimilate the first and second operating data. In some embodiments, one or more of the tracking agents 100, 100' and/or controller 112 operate on a tracking server separate from the cloud computing network 190.

In some embodiments, the tracking software operates on a tracking server that is separate from the public or private networks. In other embodiments, the tracking server is virtual and operates on the public cloud network, but operates separately from the network control software. In other words, the tracking software/server can operate independently from the network control software/server.

Network Software Architecture

Figure 3:
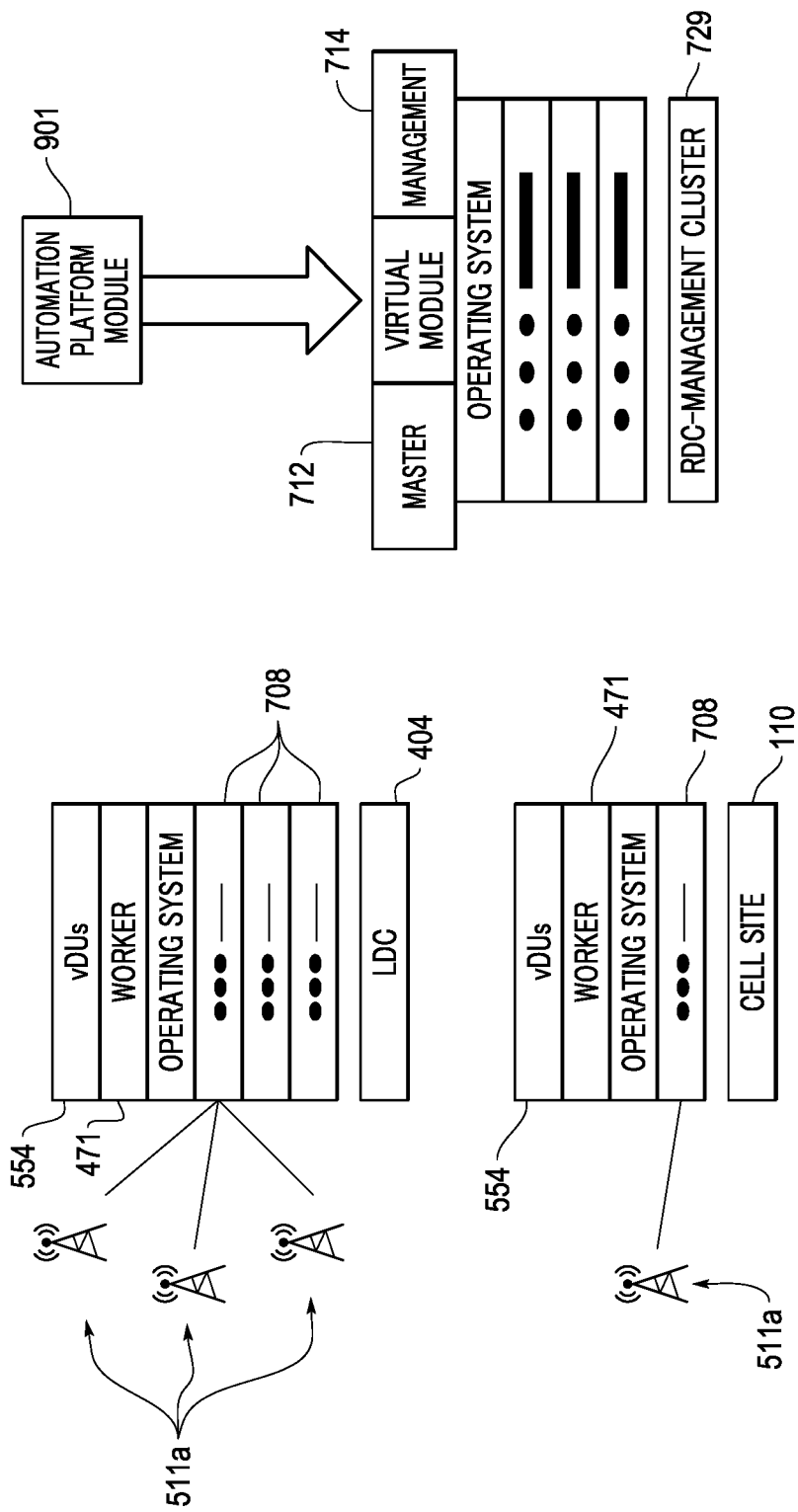
FIG. 3 illustrates a high level block diagram showing 5G cellular network with clusters.

As discussed above, the edge applications are associated with clusters that control network function. These clusters are described in detail herein. FIG. 3 illustrates an exemplary system used in constructing clusters that allows a network to control cell sites 110, according to one embodiment. The system includes a cluster configuration server that can be used by a cell site 110 to provide various containers for processing of various functions (e.g. NRF, NRF'). Each of the cell sites 110 are accessed by the client devices (i.e. User Equipment), which may be any computing device which has cellular capabilities, such as a mobile phone, computer or other computing device.

As shown in FIG. 3, the hardware system includes a regional data center (RDC) 129, one or more local data centers (LDC) 404, and one or more cell sites 110. An automation platform (AP) module 901 operates on this hardware to provide containerized applications such as kubernetes clusters.

This complex software architecture benefits from an array of data collection functions (edge applications) operating in association with different software modules. These different edge applications also operate on different hardware computers throughout the network, distributing the computational load they generate. The edge applications collect data from their associated servers and functions, sanitize the data, and send it to data aggregators.

The RDC 129 is the management cluster which manages the LDC 404 and a plurality of cell sites 110. A control plane may be deployed in the RDC 129. The control plane maintains the logic and workloads in the cell sites from the RDC 129 while each of the containers is deployed at the cell sites 110. The control plane also monitors the workloads to ensure they are running properly and efficiently in the cell sites 110 and fixes any workload failures. If the control plane determines that a workload fails at the cell site 110, for example, the control plane redeploys the workload on the cell site 110. Edge applications 102 are associated with the control plane and/or the workloads to collect data from these modules at regular or predetermined intervals. Based on this information, the edge applications can determine if any of these modules are inactive, and include this information in the operating data.

The LDC 404 is a data center that can support multiple servers and multiple towers 511a for cellular communications. Each server in the LDC 404 (as compared with the server in each cell site 110) may support multiple towers. The server 708 in the LDC may be different from the server 708 in the cell site 110 because the servers 708 in the LDC are larger in memory and processing power (number of cores, etc.) relative to the servers in the individual cell sites 110. In this regard, each server 708 in the LDC may run multiple vDUs (e.g., 2), where each of these vDUs independently operates a cell tower 511a. Thus, multiple towers 511a can be operated through the LDCs 404 using multiple vDUs using the clusters. The LDCs 404 may be placed in bigger metropolitan areas whereas individual cell sites 110 may be placed at smaller population areas. Edge applications 102 can run on each LDC or site server, and tracking resource availability and activity on both of these hardware systems.

Figure 4:
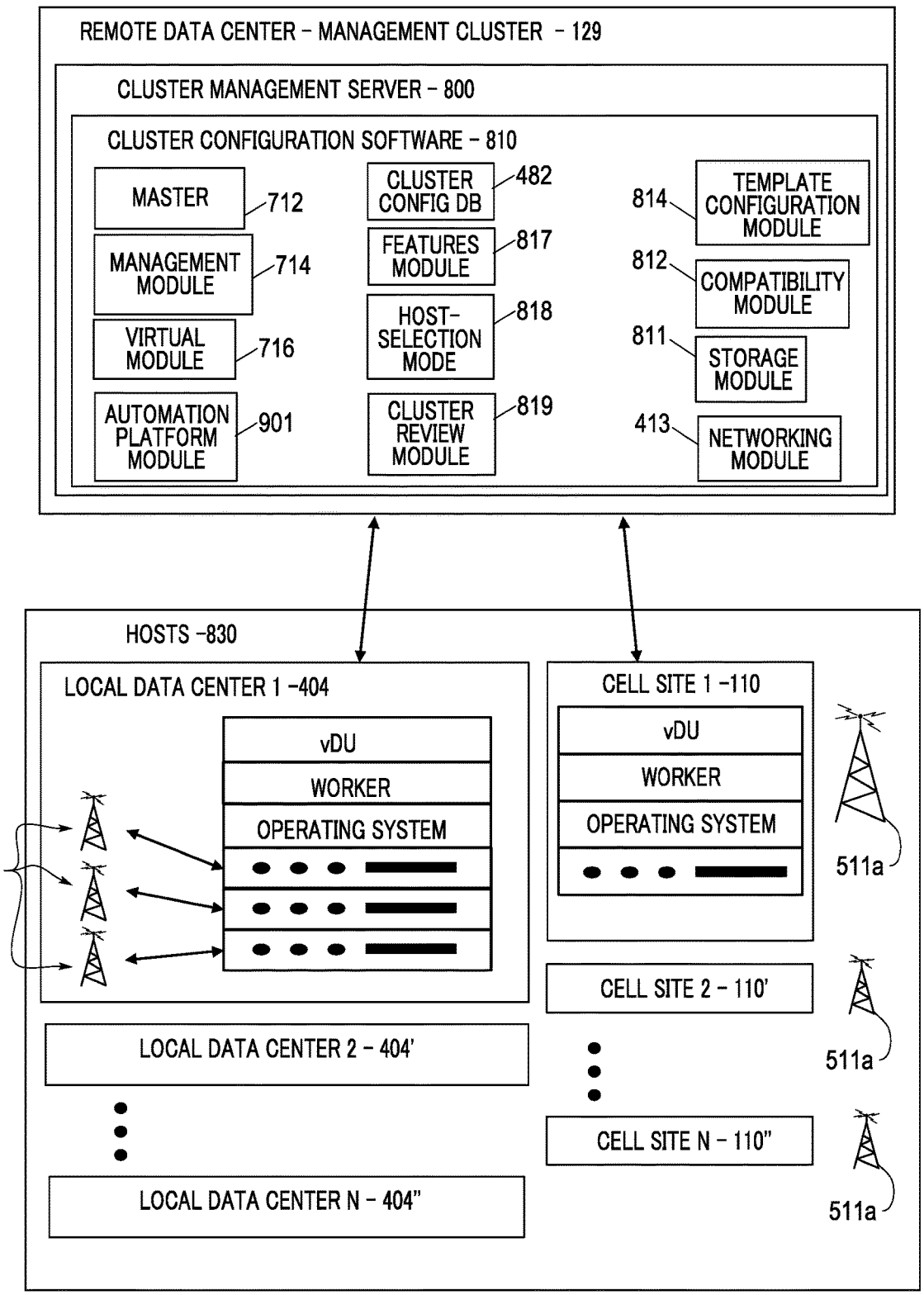
FIG. 4 illustrates a block diagram of the system of FIG. 3 but further illustrating details of cluster configuration software, according to various embodiments.

FIG. 4 illustrates a block diagram of the system of FIG. 3, while further illustrating details of cluster configuration software, according to various embodiments. As illustrated, a cluster management server 800 is configured to run the cluster configuration software 810. The cluster configuration software 810 runs using computing resources of the cluster management server 800. The cluster management server 800 is configured to access a cluster configuration database 482. This cluster configuration database 482 can store updated network resource information.

In one embodiment, the cluster configuration database 482 includes a host list with data related to a plurality of hosts 830 including information associated with hosts, such as host capabilities. For instance, the host data may include list of hosts 830 accessed and managed by the cluster management server 800, and for each host 830, a list of resources defining the respective host's capabilities. Alternately, the host data may include a list of every host in the entire virtual environment and the corresponding resources or may include only the hosts that are currently part of an existing cluster and the corresponding resources. In an alternate embodiment, the host list is maintained on a server that manages the entire virtual environment and is made available to the cluster management server 800. This host data can be updated by the data collected from the edge applications 102.

In addition to the data related to hosts 830, the cluster configuration database 482 includes features list with data related to one or more features including a list of features and information associated with each of the features. The information related to the features include license information corresponding to each feature for which rights have been obtained for the hosts, and a list of requirements associated with each feature. The list of features may include, for example and without limitations, live migration, high availability, fault tolerance, distributed resource scheduling, etc. The list of requirements associated with each feature may include, for example, host name, networking and storage requirements. Information associated with features and hosts are obtained during installation procedure of respective components prior to receiving a request for forming a cluster. This information can also be tracked and included in the operating data.

The cluster configuration software 810 includes one or more modules to identify hosts and features and manage host-feature compatibility during cluster configuration. The configuration software 810 includes a compatibility module 812 that retrieves a host list and a features list from the configuration database 482 when a request for cluster construction is received from the client. The compatibility module 812 checks for host-feature compatibility by executing a compatibility analysis which matches the feature requirements in the features list with the hosts capabilities from the host list and determines if sufficient compatibility exists for the hosts in the host list with the advanced features in the features list to enable a cluster to be configured that can utilize the advanced features. Some of the compatibilities that may be matched include hardware, software and licenses. These compatibilities can be stored and updated in the real-time database.

Additionally, the compatibility module 812 checks to determine if networking and storage requirements for each host in the cluster configuration database 482 are compatible for the selected features or whether the networking and storage requirements may be configured to make them compatible for the selected features. In one embodiment, the compatibility module checks for basic network requirements. This might entail verifying each host's connection speed and the subnet to determine if each of the hosts has the required speed connection and access to the right subnet to take advantage of the selected features. The networking and storage requirements are captured in the configuration database 482 during installation of networking and storage devices and are used for checking compatibility. The data collection functions of the edge applications 102 and the tracking agents 100 (shown in FIG. 1) can track and update this host data and requirements in real-time.

The compatibility module 812 identifies a set of hosts accessible to the cluster management server 800 that either matches the requirements of the features or provides the best match and constructs a configuration template that defines the cluster configuration settings or profile that each host needs to conform in the configuration database 482. The configuration analysis provides a ranking for each of the identified hosts for the cluster. The analysis also presents a plurality of suggested adjustments to particular hosts so as to make the particular hosts more compatible with the requirements. The compatibility module 812 selects hosts that best match the features for the cluster. The cluster management server 800 uses the configuration settings in the configuration template to configure each of the hosts for the cluster. The configured cluster allows usage of the advanced features during operation and includes hosts that are most compatible with each other and with the selected advanced features.

In addition to the compatibility module 812, the configuration software 810 may include additional modules to aid in the management of the cluster including managing configuration settings within the configuration template, addition/deletion/customization of hosts and to fine-tune an already configured host so as to allow additional advanced features to be used in the cluster. Each of the modules is configured to interact with each other to exchange information during cluster construction. For instance, a template configuration module 814 may be used to construct a configuration template to which each host in a cluster must conform based on specific feature requirements for forming the cluster. The configuration template is forwarded to the compatibility module which uses the template during configuration of the hosts for the cluster. The host configuration template defines cluster settings and includes information related to network settings, storage settings and hardware configuration profile, such as processor type, number of network interface cards (NICs), etc. The cluster settings are determined by the feature requirements and are obtained from the Features list within the configuration database 482.

A configuration display module may be used to return information associated with the cluster configuration to the client for rendering and to provide options for a user to confirm, change, or customize any of the presented cluster configuration information. In one embodiment, the cluster configuration information within the configuration template may be grouped in sections. Each section can be accessed to obtain further information regarding cluster configuration contained therein. This information can be included in the operation data.

A features module 817 may be used for mining features for cluster construction. The features module 817 is configured to provide an interface to enable addition, deletion, and/or customization of one or more features for the cluster. The changes to the features are updated to the features list in the configuration database 482. A host-selection module 818 may be used for mining hosts for cluster configuration. The host-selection module 818 is configured to provide an interface to enable addition, deletion, and/or customization of one or more hosts. The host-selection module 818 is further configured to compare all the available hosts against the feature requirements, rank the hosts based on the level of matching and return the ranked list along with suggested adjustments to a cluster review module 819 for onward transmission to the client for rendering.

The cluster review module 819 may be used to present the user with a proposed configuration returned by the host-selection module 818 for approval or modification. The configuration can be fine-tuned through modifications in appropriate modules during guided configuration set-up which are captured and updated to the host list in either the configuration database 482 or the server. The suggested adjustments may include guided tutorial for particular hosts or particular features. In one embodiment, the ranked list is used in the selection of the most suitable hosts for cluster configuration. For instance, highly ranked hosts or hosts with specific features or hosts that can support specific applications may be selected for cluster configuration. In other embodiments, the hosts are chosen without any consideration for their respective ranks. Hosts can be added or deleted from the current cluster. In one embodiment, after addition or deletion, the hosts are dynamically re-ranked to obtain a new ranked list. The cluster review module 812 provides a tool to analyze various combinations of hosts before selecting the best hosts for the cluster.

A storage module 811 enables selection of storage requirements for the cluster based on the host connectivity and provides an interface for setting up the storage requirements. Shared storage is required in order to take advantage of the advanced features. As a result, one should determine what storage is shared by all hosts in the cluster and use only those storages in the cluster in order to take advantage of the advanced features. The selection options for storage include all the shared storage available to every host in the cluster. The storage interface provides default storage settings based on the host configuration template stored in the configuration database 482 which is, in turn, based on compatibility with prior settings of hosts, networks and advanced features and enables editing of a portion of the default storage settings to take advantage of the advanced features. In one embodiment, if a required storage is available to only a selected number of hosts in the cluster, the storage module will provide necessary user alerts in a user interface with required tutorials on how to go about fixing the storage requirement for the configuration in order to take advantage of the advanced features. The storage module performs edits to the default storage settings based on suggested adjustments. Any updates to the storage settings including a list of selected storage devices available to all hosts of the cluster are stored in the configuration database 482 as primary storage for the cluster during cluster configuration.

A networking module 413 enables selection of network settings that is best suited for the features and provides an interface for setting up the network settings for the cluster. The networking module provides default network settings, including preconfigured virtual switches encompassing several networks, based on the host configuration template stored in the cluster configuration database, enables selecting/editing the default network settings to enter specific network settings that can be applied/transmitted to all hosts, and provides suggested adjustments with guided tutorials for each network options so a user can make informed decisions on the optimal network settings for the cluster to enable usage of the advanced features. The various features and options matching the cluster configuration requirements or selected during network setting configuration are stored in the configuration database and applied to the hosts so that the respective advanced features can be used in the cluster.

FIG. 4 also illustrates cell sites 110 that are configured to be clients of each cluster. Each cell site 110 includes a cell tower 511*a* and a connection to each distributed unit (DU), similar to FIG. 3. Each DU is labeled as a virtualized distributed unit (vDU) 554, similar to FIG. 3, and each vDU runs as virtual network functions (VNFs) within an open source network functions virtualization (NFV) infrastructure.

Network Structure and Hardware

An exemplary network structure, such as a cellular network structure or a 5G cellular network structure, includes a plurality of macrosites. Each macrosite will include specialized hardware and software to aid in providing cellular service to subscribers.

Figure 5:
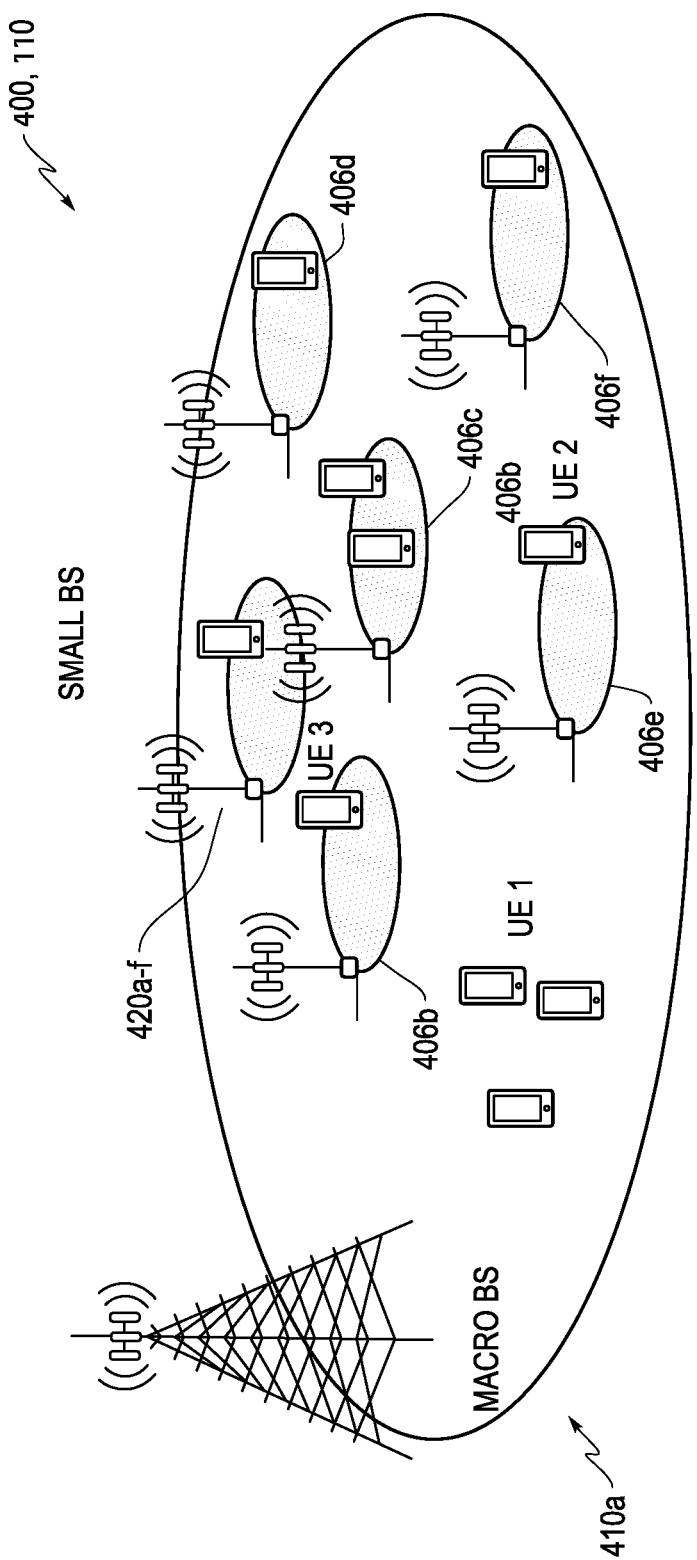
FIG. 5 illustrates a diagram of a portion of a cellular network according to some embodiments.

FIG. 5 is a diagram of a portion of an exemplary 5G or other network 400 having a cell site 110 having a macrosite 410*a*. Within each portion of the network that is fed by the cell site 110 and corresponding macrosite 410*a*, there are a plurality of smaller radio cell sites, diagrammed as small cell sites 420*a*-420*f*. Each small cell site 420*a*-*f* has a corresponding service range 406*a*-*f*. Each of the macrosite 410*a* and the small cell sites 420*a*-420*f* is allocated a band of frequencies and is served by a base station, which includes a transmitter, receiver and control unit. Adjacent cells are assigned different frequencies to avoid crosstalk or interference. However, cells that are sufficiently distant from each other can use the same frequency band.

The macrosite 410*a* and small cell sites 420*a*-*f* together provide access to the core network for any number of mobile devices and other user equipment. For example, each small cell site 420*a*-*f* will receive transmissions from one or more user equipment UE 1, UE 2, UE 3. The user equipment may be, for example, a cellular phone including a smart phone, or some other electronic device with cellular service capability such as a tablet, computer, smartwatch, cellular internet router, television, or the like. The range of coverage of the macrosite may extend approximately from about 2 to about 25 miles, or about 5 to about 18 miles, or about 10 miles in any direction. A macrosite may be capable of serving a large town, though in some scenarios the network may include multiple macrosites to handle coverage for a larger area, or where larger frequencies and/or bandwidths are required within a particular coverage area. In some very large cities, hundreds, or even thousands, of macrosites may be positioned in order to provide a desired scope of network coverage to subscribers.

In a 5G network having a portion thereof such as network 400 including a portion as shown in FIG. 5, small cells, for example small cells 420*a-f* in FIG. 5, complement macrosites, such as macrosite 410*a*, by providing network capacity for densely populated areas, thereby contributing to the formation of a heterogeneous network. The deployment of each small cell is localized, such that the small cell transmits radio signals to provide cellular and Internet services within small geographic areas. Thus, small cells are ideal for areas where signals are otherwise weak or unavailable. In order to maximize available network resources on a real-time basis, these hardware network resources are accurately inventoried in real-time. When an accurate operational data of this hardware is known to the software controller, useful adjustments can be made to resource utilization to improve network performance.

There are generally three sizes of cells, which are service areas provided by cellular base stations. First is the macro cell, serviced by a macro base station and which may have a traditional cell tower permanently installed on a property or otherwise permanently or removably mounted at a location, and usually having a battery backup storage. The macro cells provide coverage over a broad area and serve as the backbone of the network. Macro cells typically have on an order of 46 dbm, 20 watts of power, and a 2 km radius The other cells are small cells and micro cells, serviced by base stations that are more compact and can be integrated into buildings, light poles, and so forth. The small and micro cells fill in the service holes of the macro cells, and provide service inside buildings, inside tunnels, under bridges, and other places where macro cell service is poor. The small and micro cells can also be deployed in areas where extra bandwidth is needed, such as sports stadiums, urban centers, or other areas where large gatherings are expected. Small cells typically have on order of a less than 1 km radius. Small cells also often operate a low frequency band such as 3 Mhz. Micro cells are often on light poles or other existing tower infrastructure and have a smaller radius than a small cell. Micro cells also usually operate on a single band.

Cell sites (i.e. cellular base stations) include macrosites, also known in the art as macro cell sites), which in turn include Remote Radio Units (RRUs) provide wireless access to the data network to user equipment (UE). RRUs are a type of Radio Unit (RU), both of which contain RF circuitry, analog-to-digital converters, digital-to-analog converters, and so forth to perform wireless communication using a cellular antenna at the cell site.

Network Software

As shown in FIG. 6, the RAN base station 110 (i.e. cell site; e.g., as part of macrosite 410*a* shown in FIG. 5) is provided with software as described herein. The RAN base station 110 includes a tower 511*a* and hardware as discussed with reference to FIG. 13. The RAN base station 110 also includes a radio unit (RU) or remote radio unit 553, and, either onsite or connected thereto, a vDU 554, and a vCU 555. In some embodiments, the vDU may simply be a distributed unit (DU), and the vCU may simply be a centralized unit (CU), though the embodiments described herein utilize virtualized units.

In the embodiment shown in FIG. 6, the vDU 554 is housed within a central office 514, which may be at the local macrosite or may be at a centralized location where one or more vDUs operating with one or more macrosites are housed. In the embodiment, the vCU 555 is housed within a core network 515, which may be at the local macrosite or may be at a centralized location where one or more vDUs operating with one or more macrosites are housed.

More specifically, FIG. 6 illustrates a system that delivers full RAN functionality using network functions virtualization (NFV) infrastructure. This approach decouples baseband functions from the underlying hardware and creates a software fabric. Within the solution architecture, virtualized baseband units (vBBUs) process and dynamically allocate resources to RRUs 553 based on the current network needs. Baseband functions are split between vCUs 555 and vDUs 554 that can be deployed in the central office 514 or another aggregation center using a distributed architecture, such as using kubernetes.

In this embodiment, the RRU 553 is located at a distributed compute site 513, possibly at the macrosite 410*a*. The macrosite 410*a* is a location containing the antennas 1300, RRU 553, and network connectivity equipment and power storage equipment described with reference to FIGS. 1-4.

RRU 553 contains a transceiver for wirelessly communicating with User Equipment (UEs), such as UE1-UE3 in FIG. 5. The vDU 554 is located at a central office 514 or local data center of the network provider. The vCU 555 is part of the core network 515 and may be a software entity that operates over a network of cloud servers.

As a non-limiting example, the network of cloud servers, defined in more detail later, may comprise a physical, virtual, or combination of physical and virtual infrastructure whereby one or more servers can be divided, using virtualization software often including a hypervisor, into plural virtual servers. These virtual servers can include public and/or private cloud servers, and be tied to one or more processors, which can be hardware hosted at the physical server or elsewhere, and can then be accessed through the internet. In embodiments, the servers and processors together create a cloud-based architecture that can perform the functions described herein.

The distributed compute site 513 also includes a site controller and site router (i.e. network communicator). The site controller includes a processor configured to execute certain local control functions, which will be detailed further herein. The site router connects the cell site to the cellular network controllers, and provides internet service to the cell site which is distributed to the UEs wirelessly via the RRU 553.

vCUs 555 and vDUs 554 run as virtual network functions (VNFs) within the NFV infrastructure. The entire software stack that is needed is provided for NFV, including open source software. This software stack and distributed architecture increases interoperability, reliability, performance, manageability, and security across the NFV environment.

RAN standards use deterministic, low-latency, and low-jitter signal processing. These are achieved using containerized applications (e.g., Kubernetes clusters), described above, to control each RAN. Moreover, the RAN may support different network topologies, allowing the system to choose the location and connectivity of all network components. Thus, the system allowing various vDUs 130 on containerized applications (e.g., Kubernetes clusters) allows the network to pool resources across multiple cell sites 110, scale capacity based on conditions, and ease support and maintenance requirements.

In some instances, an observability framework (OBF) is used to control the cell sites and to automatically notify the RAN Operations, Administration, and Maintenance (OAM) system of network events.

Figure 7:
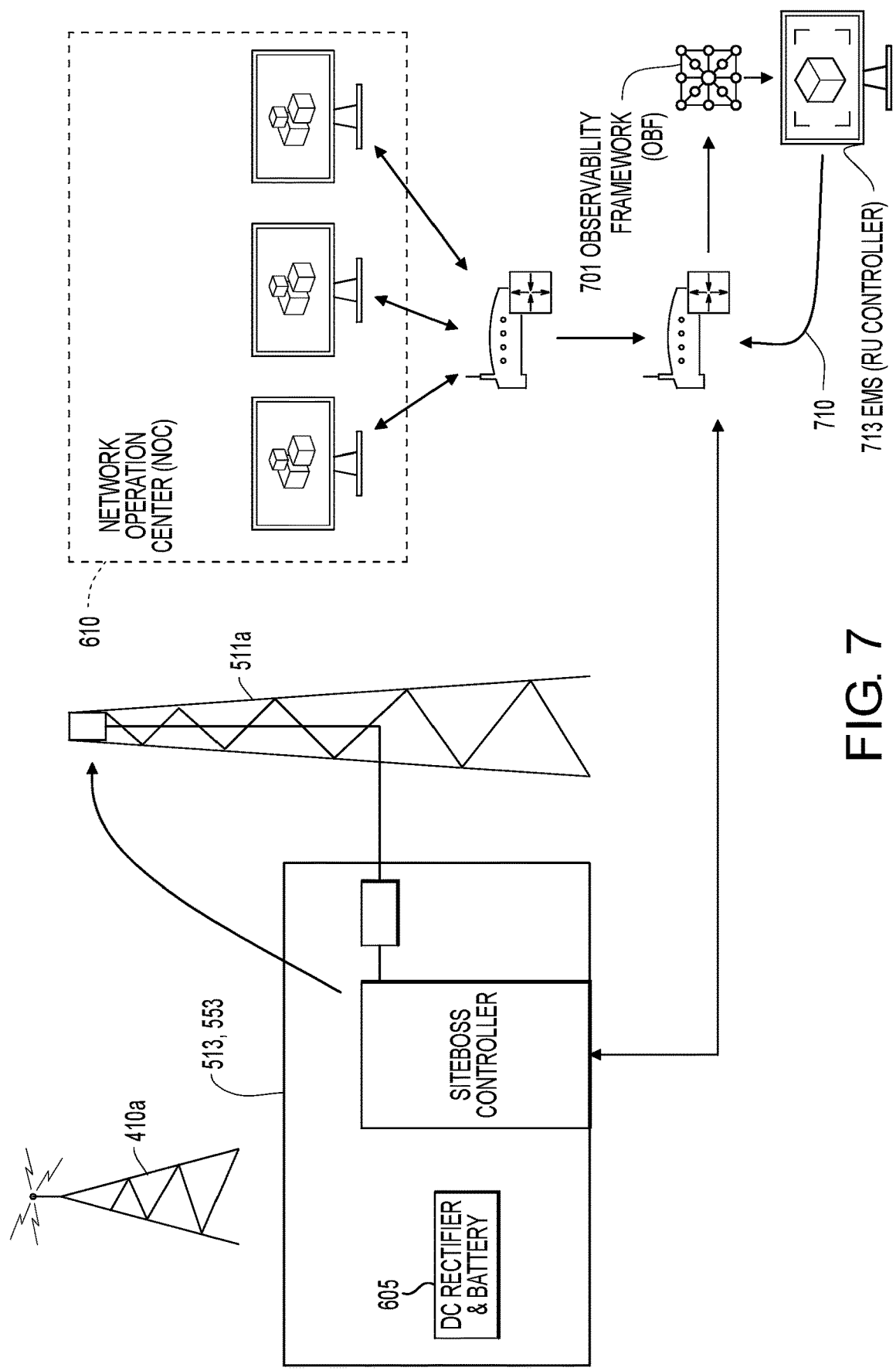
FIG. 7 illustrates a block diagram of a cellular network according to some embodiments.
Figure 8:
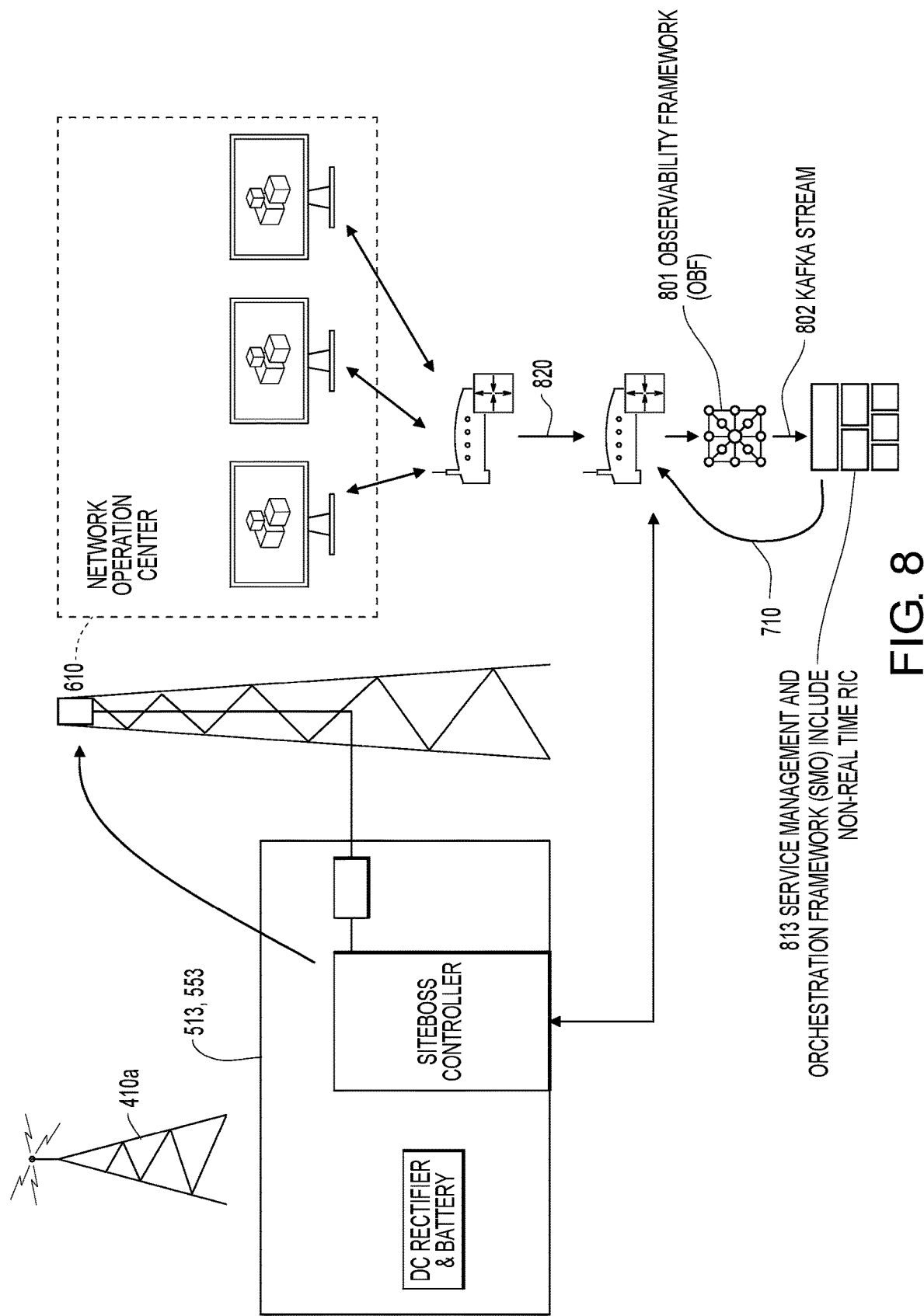
FIG. 8 illustrates a block diagram of a cellular network according to some embodiments.

FIGS. 7 and 8 show cellular networks according to embodiments herein. Traditionally, cell site events are sent to the NOC 210. However, in embodiments herein, the event is also sent from telecom site automation system to OBF 701/801 by adding the OBF IP address in a Simple Network Management Protocol (SNMP) trap destination. When OBF 701/801 receives the SNMP trap, OBF 701/801 can convert/ replicate the traps to events 820 for event store/stream-processing software. The event store/stream-processing software can be built into the OBF 701/801.

After the event store/stream-processing catalogues these events 820, they can be handled in one of two ways described below, and shown in FIGS. 7 and 8, respectively.

EMS/NMS Built-In Intelligence Monitoring and Control

While the network is running, the support module will collect various data to ensure the network is running properly and efficiently. This observability framework ("OBF") collects telemetry data from all network functions that will enable the use of artificial intelligence and machine learning to operate and optimize the cellular network.

This adds to the telecom infrastructure vendors that support the RAN and cloud-native technologies as a provider of Operational Support Systems ("OSS") services. Together, these OSS vendors will aggregate service assurance, monitoring, customer experience and automation through a singular platform on the network.

The OBF brings visibility into the performance and operations of the network's cloud-native functions ("CNFs") with near real-time results. This collected data will be used to optimize networks through its Closed Loop Automation module, which executes procedures to provide automatic scaling and healing while minimizing manual work and reducing errors.

FIG. 7 shows a diagram of a cellular network according to embodiments herein. As discussed above, the operating parameters of the RRU or RRUs 553 operating the cells are monitored. In embodiments herein, the OBF 701/801 operates to collect telemetry data from all network functions. This, in combination with the use of cloud computing, enables the use of artificial intelligence and machine learning to operate and optimize the cellular network. One of the functions of the OBF 701/801 is to collect SNMP traps and convert them to events such as power-related events, which cloud based network management software can recognize.

In the embodiment of FIG. 7, EMS (Element Management System) or NMS (Network Management System) 713 are cloud based network functions. This software communicates with the RRU 553 via the OBF 701/801 in order to alert the artificial intelligence network manager of an event at the RRU 553. In some embodiments, the EMS/NMS 713 acts as a controller of the RRU 553.

These events can be sent to, recognized by, and acted upon by the EMS/NMS 713. The EMS/NMS 713 can directly subscribe to cell site topics in the event store/ stream-processing software. Hence, when an event such, the built-in intelligence of the EMS/NMS 713 will receive the event through the subscription, will identify cells impacted by the event, and will send Remote Procedure Call (RPC) commands 710 to RRUs 553.

Non-Real-Time RAN Intelligent Controller Monitoring and Control

FIG. 8 shows a diagram of a cellular network according to embodiments herein. In this embodiment, instead of using the EMS/NMS 713 to monitor and respond to events, a Non-Real-Time RAN Intelligent Controller (Non-RT RIC) 813 performs this function utilizing a kafka stream 802 to receive data from OBF 701/801.

The Non-RealTime RIC 813 is an Orchestration and Automation function described by the O-RAN Alliance for non-real-time intelligent management of RAN (Radio Access Network) functions. The primary goal of the Non-RealTime RIC 813 is to support non-real-time radio resource management, higher layer procedure optimization, policy optimization in RAN, and providing guidance, parameters, policies and AI/ML models to support the operation of near-RealTime RIC functions in the RAN to achieve higher-level non-real-time objectives. NONRTRIC functions include service and policy management, RAN analytics and model-training for the near-RealTime RICs. This can be achieved using the sanitized data generated by the data collection edge applications. In other words, the sanitized data can be used to monitor network operation in real-time or near-real-time.

The Non-RealTime RIC 813 can communicate with near-RealTime RIC elements in the RAN via an A1 interface. Using the A1 interface the NONRTRIC can facilitate the provision of A1 Policies; monitor and provide basic feedback on policy state from near-RealTime RICs; provide A1 Enrichment Information as required by near-RealTime RICs; act as a hosting platform for rApps (Non-RealTime RIC applications); host the R1 interface between rApps and the underlying SMO and Non-RT-RIC platforms; and manage the exposure towards rApps of SMO platform functions, Non-RT-RIC platform functions, and the capabilities of other rApps. The NONRTRIC functions support non-real-time control of the RAN (Radio Access Network).

In the embodiment of FIG. 8, these events (i.e. cell-site events stored in the event store/stream-processing software) can be sent to, recognized by, and acted upon by the Non-RT RIC 813. The Non-RT RIC 813 can directly subscribe to cell site topics in the event store/stream-processing software.

Integration with a Cloud-Based Network

Traditional cellular networks use a centralized or proprietary server to connect the various RRUs 553 to the internet. This arrangement limits the computational power of the network controller. As a result, as shown in FIG. 6, a human controller 620 is needed to handle network events. These human controllers 620 are expensive and have performance limitations, including slow reaction times, lack of situational awareness, and human error.

One potential solution would be to implement an artificial intelligence software-based network controller. However, the network control/access servers presently used on cellular networks lack the computational power to perform such functions. Moreover, their geographic remoteness from some of the RRUs in the network limits their ability to quickly react to problems in distant parts of network.

Embodiments herein use a cloud-based network instead of a traditional server for network control and access operations. The computational power of the cloud-based network enables the use of artificial intelligence and machine learning network control software. Also, RRUs in all parts of the network can be controlled in a time-effective manner by this system, because the cloud-based servers are spread over a wide geographic area. Therefore, RRUs can be controlled by software operating on a relatively nearby cloud server. This configuration is what allows the network control software described herein to perform functions that cannot be performed by either a human being or a generic computer.

To implement this system, software is installed over a large number of cloud-based servers. This is accomplished by using a containerized application such as a cluster, for example a Kubernetes cluster, described above. A cluster is an example of a set of nodes that run containerized applications. Containerizing applications is an operating system-level virtualization method used to deploy and run distributed applications without launching an entire virtual machine (VM) for each application.

A cluster configuration software is available at a cluster configuration server. This guides a user, such as system administrator, through a series of software modules for configuring hosts of a cluster by defining features and matching hosts with requirements of features so as to enable usage of the features in the cluster. The software automatically mines available hosts, matches host with features requirements, and selects the hosts based on host-feature compatibility. The selected hosts are configured with appropriate cluster settings defined in a configuration template to be part of the cluster. The resulting cluster configuration provides an optimal cluster of hosts that are all compatible with one another and allows usage of various features. Additional benefits can be realized based on the following detailed description.

The present application uses such kubernetes clusters to deploy a RAN base station 1411 so that the vDU 554 corresponding to the RAN base station 1411 is located at one kubernetes cluster and the vCU 555 is located at a remote location from the vDU 554. This configuration allows for a more stable and flexible configuration for the RAN base station 1411 and cell site 110 generally.

The cell sites, including cell site 110, provide cellular service to the client devices (e.g., user equipment U1-U3) through the use of a vDU 554 and a tower 511*a*. The server at a cell site 110 controls the vDU 554 located at the cell site 110, which in turn controls communications from the tower 511*a*. The or each vDU 554 includes software to control the communications with the towers 511*a*, RRUs 553, and vCU 555 so that communications from client devices (user equipment or UEs) can communicate from one tower 511*a* through the kubernetes clusters to another cellular tower. In other words, the voice and data from a UE transmits to the towers 511*a* and then goes through the vDU 554 to transmit such voice and data to another vDU 554 to output such voice and data to another tower 511*a*. This allows transmission from one UE to another UE.

Artificial Intelligence & Machine Learning Software

The software architecture of embodiments herein is shown in FIG. 9. Here, the vDUs 554 on each individual cell site 110 or central office 514/Local Data Center (LDC) 404 may not have enough computing power to run a control plane that supports the functions in the mobile telecommunications system to establish and maintain the user plane. As such, the control plane is then run in a location that is remote from the cell sites 110, such as a Regional Data Center (RDC) 129. The RDC 129 is implemented on a cloud-based public network 190. This control plane can be e.g. artificial intelligence network control software.

The RDC 129 is the management cluster which manages the central office 514 and a plurality of cell sites, one of which is depicted as cell site 110. As mentioned above, the control plane may be deployed in the RDC 129. The control plane maintains the logic and workloads in the cell sites from the RDC 129 while each of the containerized applications (e.g., Kubernetes containers) is deployed at the cell site 110. The control plane also monitors that the workloads are running properly and efficiently in the cell site 110 and fixes any workload failures. If the control plane determines that a workload fails at the cell site 110, for example, the control plane may redeploy the workload on the cell site 110, for example to another of the cell sites or another component connected to the public network 190.

The RDC 129 may include a master 712 (or Kubernetes master, or Kubernetes master module, or master module), a kubernetes management module 714 and a virtual (or virtualization) module 716. The master module 712 monitors and controls the kubernetes workers 471 (as shown in FIG. 3) and the applications running thereon, such as the vDUs 554. If a vDU 554 fails, the master module 712 recognizes this, and will redeploy the vDU 554 automatically. In this regard, the kubernetes clusters system has intelligence to maintain the configuration, architecture and stability of the applications running. In this regard, the kubernetes clusters system may be considered to be "self-healing" or "machine learning."

The artificial intelligence network control software can operate by generating a model of the radio access network and associated components such as RAN base station 1411. The software can then be run under simulation conditions in order to perform machine learning. During the simulated operation of the network controller, optimization of the operating parameters is performed in order to improve performance of the network control software. For example, a simulation of the battery storage level of RRUs in a network can be run on the network control software prior to implementation.

The management module 714 along with an Automation Platform 901 creates the kubernetes clusters in the central office 514 and cell sites 110. For each of the vDUs 554 in the central office 514 and the cell sites 110, an operating system is loaded in order to run the kubernetes workers 471. The vDUs 554 are also implemented by software that runs on the kubernetes workers 471. In this regard, the software layers are the operating system, and then the kubernetes workers 471, and then the vDUs 554.

The central office 514 may be a local data center that can support multiple vDUs 554 and multiple towers 511*a* for cellular communications. The central office 514 is similar to the cell sites 110 except that each central office has multiple vDUs 554 and multiple towers 511*a* associated therewith. Each server in the central office 514 (as compared with the vDU 554 in each cell site 110) may support multiple towers 511*a*. The server in the central office 514 may be different from the server in the cell site 110 because the servers in the central office may be larger in memory and processing power (for example number of cores) relative to the servers in the individual cell sites 110. In this regard, each server in the central office 514 may run multiple vDUs 554. In some embodiments, each server may run 2 or more, or 3 or more, or exactly 2 vDUs 554, where each of these vDUs 554 independently operates a cell tower 511*a*. Thus, multiple towers 511*a* can be operated through the central office 514 using multiple vDUs using the kubernetes clusters. The central office 514 or multiple central offices may be placed in bigger metropolitan areas whereas individual cell sites 110 may be placed at smaller population areas.

FIG. 9 also illustrates cell sites 110 that are configured to be clients of each cluster. Each cell site 110 is shown as including a cellular tower 511*a* and a connection to each distributed unit (DU), similar to FIG. 6. Each DU is labeled as a virtualized distributed unit (vDU) 554, similar to FIG.

6, and each vDU runs as virtual network functions (VNFs) within the an open source network functions virtualization (NFV) infrastructure.

Regionalized Network Implementation

FIG. 9 also illustrates a block diagram of stretching the containerized applications (e.g., Kubernetes clusters) from a public network (e.g. cloud-based network) 190 to a private network 950 and across the availability zones, according to various embodiments.

This is done by the automation platform module 901 creating master modules 712 in the control plane 910 located within the public network 190. The containerized applications (e.g., Kubernetes clusters) are then created as explained above but are created in both public and private networks 190, 950.

The public network 190 shown in FIG. 9 shows an exemplary embodiment where there are three availability zones AZ1, AZ2 and AZ3. These three availability zones AZ1, AZ2 and AZ3 are in three different geographical areas. For example, AZ1 may be in the western area of the United States, AZ2 may be in the midwestern area of the United States, and AZ3 may be in the eastern area of the United States.

A national data center (NDC) 192 is shown as deployed over all three availability zones AZ1, AZ2 and AZ3 and the workloads will be distributed over these three availability zones AZ1, AZ2 and AZ3. It is noted that the NDC is a logical creation of the data center instead of a physical creation over these zones. The NDC is similar to the RDC 129 but instead of being regional, it is stretched nationally across all availability zones.

It is noted that the control plane 910 stretches across availability zones AZ1 and AZ2 but could be stretched over all three availability zones AZ1, AZ2 and AZ3. If one of the zones fails the control plane 910 would automatically be deployed on the other zone. For example, if zone AZ1 fails, the control plane 910 would automatically be deployed on AZ2. This is because each of the software programs which are deployed on one zone are also deployed in the other zone and are synced together so that when one zone fails, the duplicate started software automatically takes over. This creates significant stability.

Moreover, because the communication is to and from a private network, the communications between the public and private networks may be performed by pre-authorizing the modules on the public network to communicate with the private network.

The private network 950 includes the central office 514 and cell sites 110 as well as an extended data center (EDC) 980. The central office 514 and cell sites 110 interact with the EDC 980 as the EDC 980 acts a router for the private network 950. The EDC 980 is configured to have a concentration point where the private network 950 will extend from. All of the central offices 514 and cell sites 110 may connect to only the EDC 980 so that all of the communications to the private network 950 can be funneled through one point. This may improve security and/or efficiency.

The master modules 712 control the vDUs 554 so that the clusters are properly allowing communications between the private network 950 and the public network 190. There are multiple master modules 712 so that if one master module fails, one of the other master modules takes over. For example, as shown in FIG. 9, there are shown three master modules 712 and all three are synced together so that if one fails, the other two are already synced together to automatically become the controlling master. However, the number of master modules 712 is not so limited and may be only 1, or 2, or 3, or 4 or more.

Each of the master modules 712 performs the functions as discussed above, including creating and managing the vDUs 554. This control is shown over path B which extends from a master module 712 to each of the vDUs 554. In this regard, the control and observability of the vDUs 554 occurs only in the public network 190 and the vDUs 554 and the containerized applications (e.g., Kubernetes clusters) are in a private network 950.

There is also a module for supporting functions and Platform as a Service (PaaS) 960 (the support module 960). There are some supporting functions that are required for observability and this support module 960 will provide such functions. The support module 960 manages all of the vDUs 554 from an observability standpoint to ensure it is running properly and if there are any issues with the vDUs 554, notifications will be provided. The support module 960 is provided on the public network 190 to monitor any of the vDUs 554 across any of the availability zones.

The master modules 712 thus create and manage the containerized applications (e.g., Kubernetes clusters) and create the vDUs 554 and the support module 960, and the support module 960 then supports the vDUs 554. Once the vDUs 554 are created, they run independently, but if a vDU fails (as identified by the support module 960) then the master module 712 can restart the vDU 554.

Once the software (e.g., clusters, vDUs 554, support module 960, master module 712, and others) is set up and running, the user voice and data communications received at the towers 511a and is sent over the path of communication A so that the voice and data communications is transmitted from tower 511a, to a vDU 554, and then to the vCU 555 in a Kubernetes cluster 931. This path of communication A is separate from the path of communication B for management of the DUs for creation and stability purposes.

Observability Framework

As noted above, OBF brings visibility into the performance and operations of the CNFs with near real-time results. This collected data will be used to optimize networks through its Closed Loop Automation module, which executes procedures to provide automatic scaling and healing while minimizing manual work and reducing errors.

Figure 10:
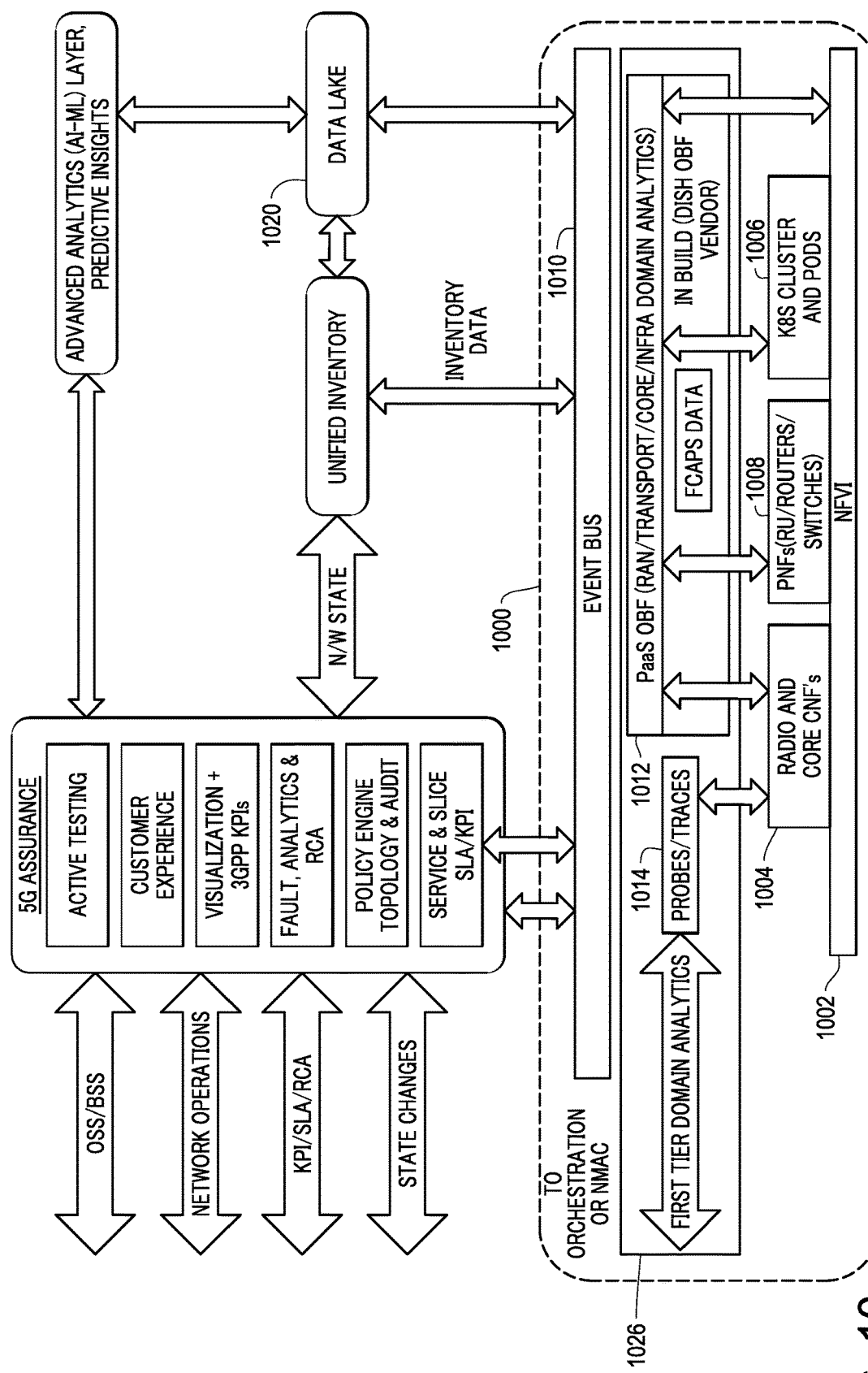
FIG. 10 illustrates the network described of FIG. 9 and others, and also explains how data is collected according to various embodiments.

This is shown in FIG. 10, which is described below. FIG. 10 is another representation of components of the network described with respect to FIG. 9 above but also explains how data is collected according to various embodiments. The system 1000 includes the networked components as well as the observability layers.

First, a network functions virtualization infrastructure ("NFVI") 1002 encompasses the networking hardware and software needed to support and connect virtual network functions in carrier networks. This includes the kubernetes cluster as discussed herein.

On top of the NVFI 1002, there are various domains, including the Radio (or RAN) and Core CNFs 1004, clusters (e.g., Kubernetes clusters) and pods (e.g., containers) 1006 and physical network functions ("PNFs") 1008. The PNFs may include hardware components such as an RU (e.g., RRU 553), routers, switches and other hardware components of the cellular network. These domains are not exhaustive and there may be other domains that could be included as well.

The domains transmit their data using probes/traces 1014 to a common source, namely a Platform as a Server ("PaaS") OBF layer 1012. The PaaS OBF layer 1012 may be located within the support module 960 on the public network 190 of FIG. 9 so that it is connected to all of the vDUs 554 and vCUs 555 to pull all of the data from the RANs and Core CNFs 1004. As such, all of the data relating to the RANs and Core CNFs 1004 are retrieved by the same entity deploying and operating each of the vDUs 554 of the RANs as well as the operator of the Core CNFs 1004. In other words, the data and observability of these functions do not need to be requested from vendors of these items and instead are transmitted to the same source which is running these functions, such as the administrator of the cellular network.

The data retrieved are key performance indicators ("KPI") and alarms/faults. KPI are the critical indicators of progress toward performing cellular communications and operations of the cellular network. KPIs provides a focus for strategic and operational improvement, create an analytical basis for decision making and help focus attention on what matters most. Performing observability with the use of KPIs includes setting targets (the desired level of performance) and tracking progress against that target.

The PaaS OBF and event bus (e.g., kafka bus) retrieves the distributed data collection system so that such data can be monitored. This system uses the kubernetes cluster structure, uses event handling as an intermediate node of data convergence, and finally use data storage for storing the collected and analyzed data.

In this system, the actual data collection tasks may be divided into two different functions. First the PaaS OBF is responsible for collecting data from each data domain and transmitting it to event bus and then, the event bus is responsible for persistent storage of data collected from event logging after aggregation. The master is responsible for maintaining the deployment of the PaaS OBF and event bus and monitoring the execution of these collection tasks.

The PaaS OBF performs the actual collection task after registering with the master module. Among the tasks, the PaaS OBF aggregates the collected data into the event bus according to the configuration information of the task, and stores the data in specified areas of the event bus according to the configuration information of the task and the type of data being collected.

Specifically, when PaaS OBF collects data, it needs to segment data by time (e.g., data is segmented in hours), and the time segment information where data is located is written as well as the collected data entity in the event bus. In addition, because the collected data is stored in the event bus in the original format, other processing systems can transparently consume the data in the event bus without making any changes.

In the process of executing the actual collection task, the PaaS OBF also needs to maintain the execution of the collection task, and regularly reports it to the specific event bus, waiting for the master to pull and cancel the consumption. By processing the heartbeat data reported by the subordinate event handler, the controller can monitor the execution of the collection task of the PaaS OBF and the event bus.

As can be seen, all of the domains are centralized in a single layer PaaS OBF. If some of the domains are provided by some vendors and other by other vendors and these vendors would typically collect data at their networks, the PaaS OBF collects all of the data over all vendors and all domains in a single layer and stores the data in a centralized in long term storage using the event bus. This data is all accessible to the system at a centralized database or centralized network, such as network 190 discussed above with regard to FIG. 9. Because all of the data is stored in one common area from various different domains and even from product managed by different vendors, the data can then be utilized in a much more efficient and effective manner.

There are two types of storage areas for collection of the data. The PaaS OBF is the first storage. In this regard, the collection of data is short term storage by collecting data on a real time basis on the same cloud network where the core of the RAN is running and where the master modules are running (as opposed to collecting the data individually at the vendor sites). In this regard, the data is centralized for short term storage, as described above.

There is also a second storage, which is longer term storage on the same cloud network as the first storage 1016 and the core of the RAN. This second data storage allows data that can be used by any applications without having to request the data on a database or network in a cloud separate from the core and master modules.

There are other storage types as well such as a data lake 1020 which provides more of a permanent storage for data history purposes.

It should be noted that the data collected for all storage types are centralized to be stored on the public network, such as the public network 190 discussed above with regard to FIG. 9.

Figure 11:
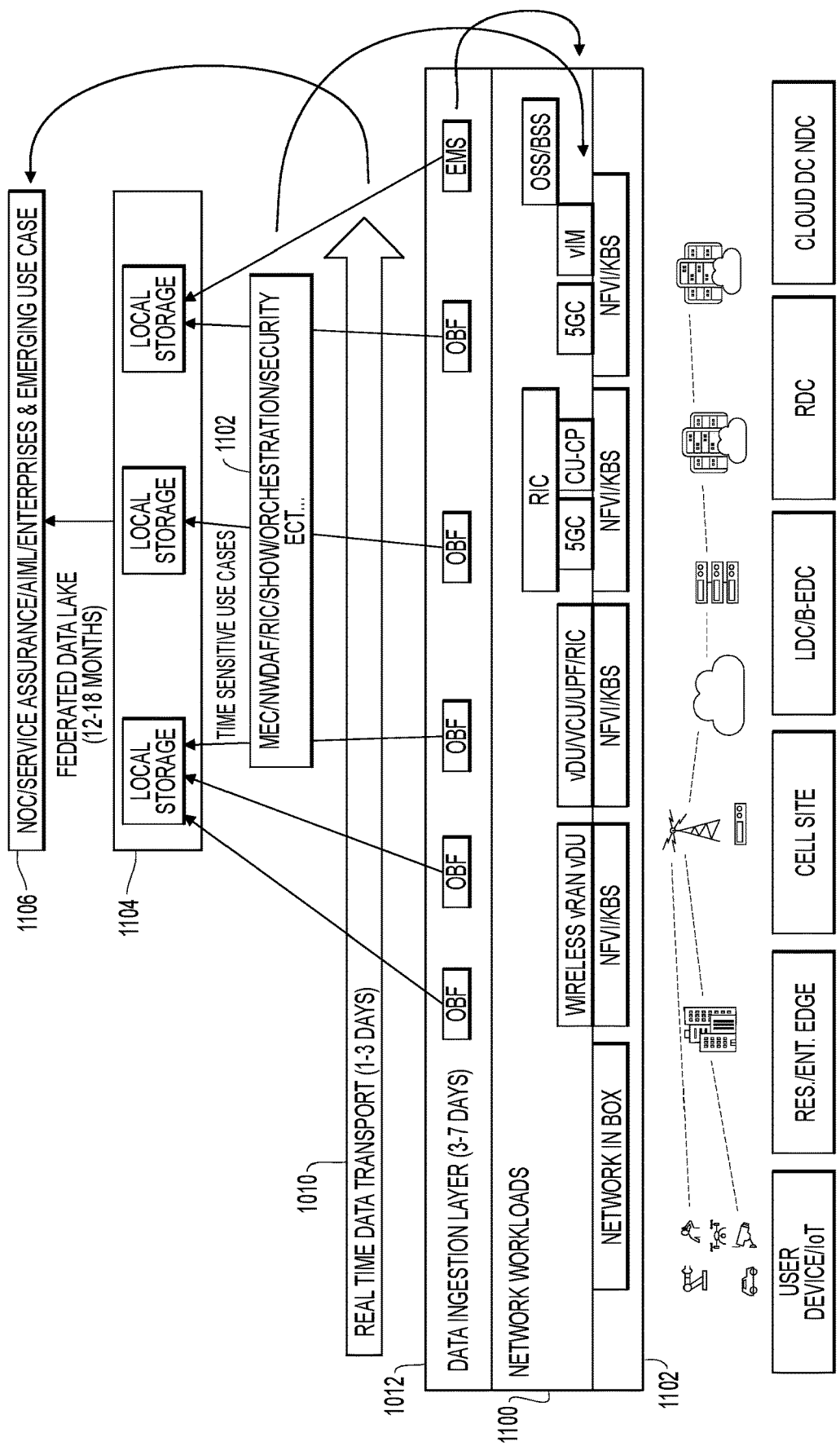
FIG. 11 illustrates an overall architecture of the OBF as well as the layers involved.
Figure 12:
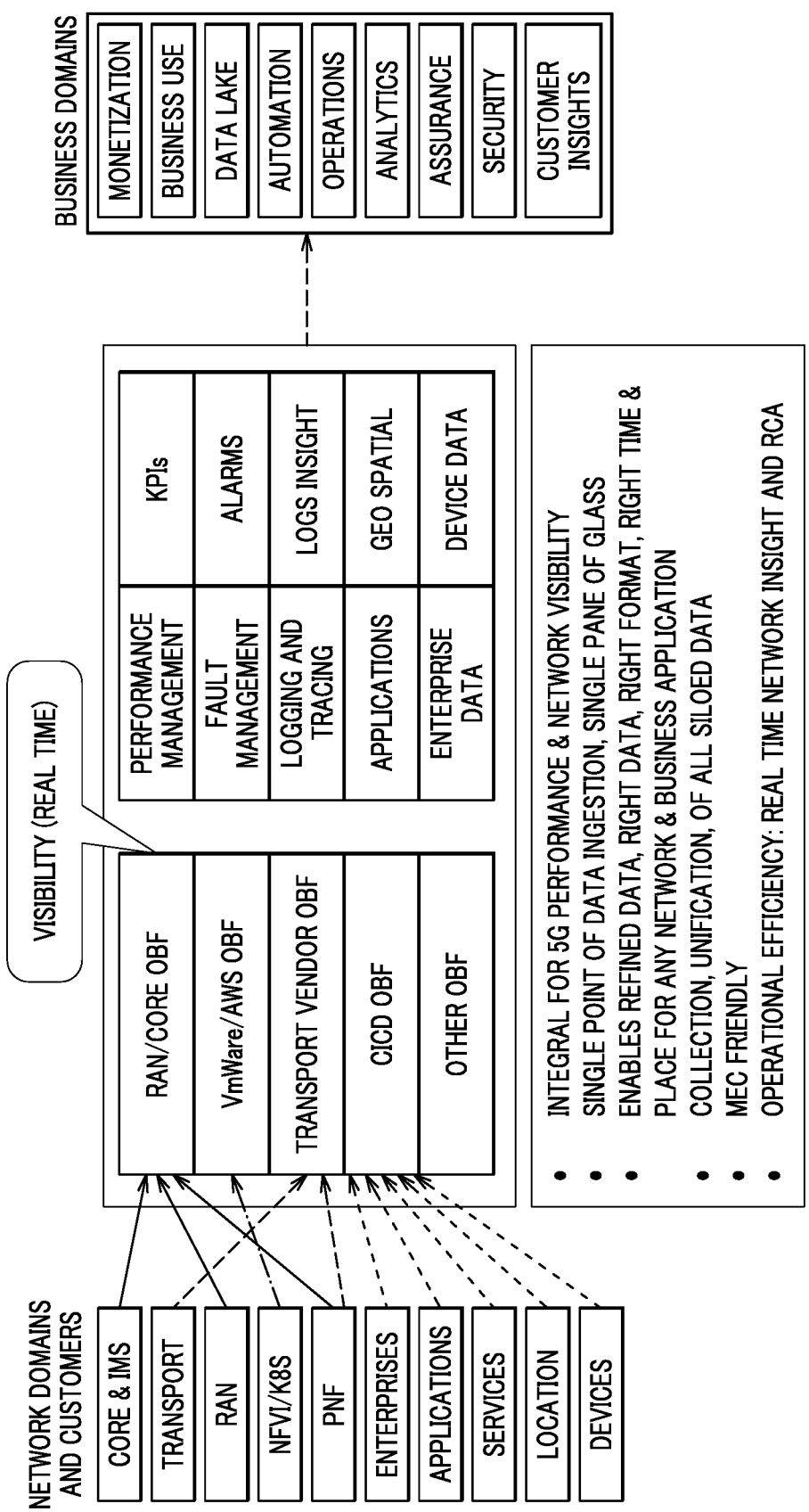
FIG. 12 illustrates an overall architecture of the OBF as well as the layers involved.

FIGS. 11 and 12 show an overall architecture of the OBF as well as the layers involved. First, in FIG. 11, there are three layers shown: the PaaS OBF layer 1012, the event handling layer 1010 (also shown in FIG. 10) and the storage layer 1104. There are time sensitive use applications 1102 which use the data directly from the event handling layer 1010 for various monitoring and other applications which need data on a more real-time basis, such as MEC, security, orchestration, etc. Various applications may pull data from the PaaS OBF layer since this is a real-time data gathering.

There are other use cases 1106 that can obtain data either from the PaaS OBF layer 1012, the event handling layer 1010 and the storage layer 1104, depending on the applications. Some applications may be NOC, service reassurance, AIML, enterprises, and emerging use.

As shown in FIG. 11, there are more details on various domains 1100, such as cell sites (vDU, vRAN, etc.), running on the NFVI 1002 layer. Also, as shown, the NFVI receives data from various hardware devices/sites, such as from cell sites, user devices, RDC, and so on.

In FIG. 12, the network domains and potential customers/users are shown on the left with core and IMS, transport, RAN, NFC/kubernetes (K8S), PNF, enterprises, applications, services, location, and devices. All of these domains are collected in one centralized location using various OBF collection means. For example, data from the core and IMS, RAN, and NFC/kubernetes domains are collected using the RAN/Core OBF platform of the PaaS layer 1012. Also, data from the RAN and PNF domains are collected on the transport OBF layer. In any event, all of the data from the various domains and systems, whether or not there are multiple entities/vendors managing the domains, are collected at a single point or single database and on a common network/server location. This allows the applications (called "business domains" in the right-hand side of FIG. 12) to have a single point of contact to retrieve whatever data is needed for those applications, such as security, automation, analytics, assurance, and so forth.

Hardware Configuration of Cellular Base Stations

Figure 13:
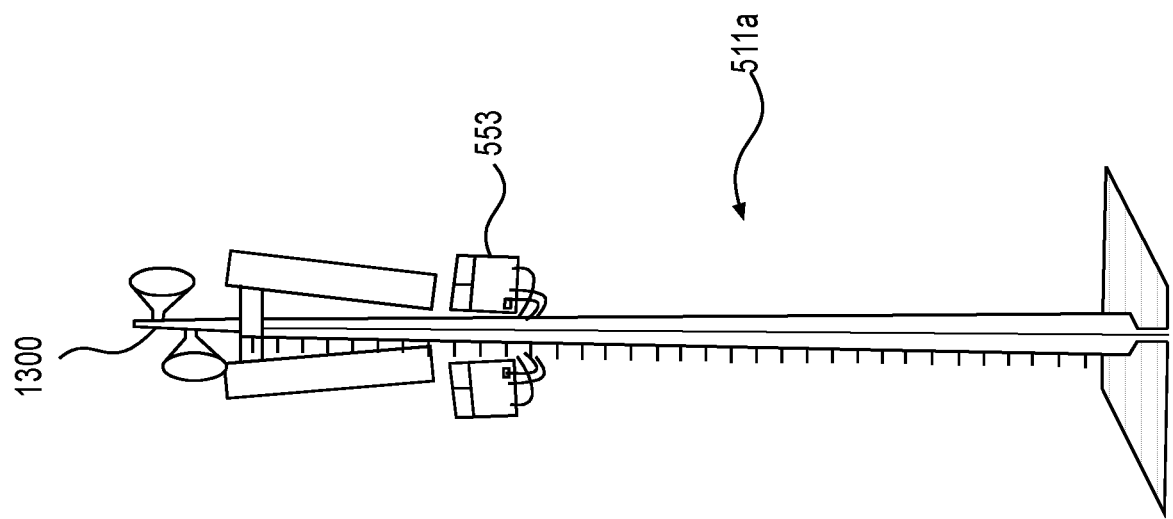
FIG. 13 illustrates a diagram of a cell site within a cellular network according to some embodiments.
Figure 14:
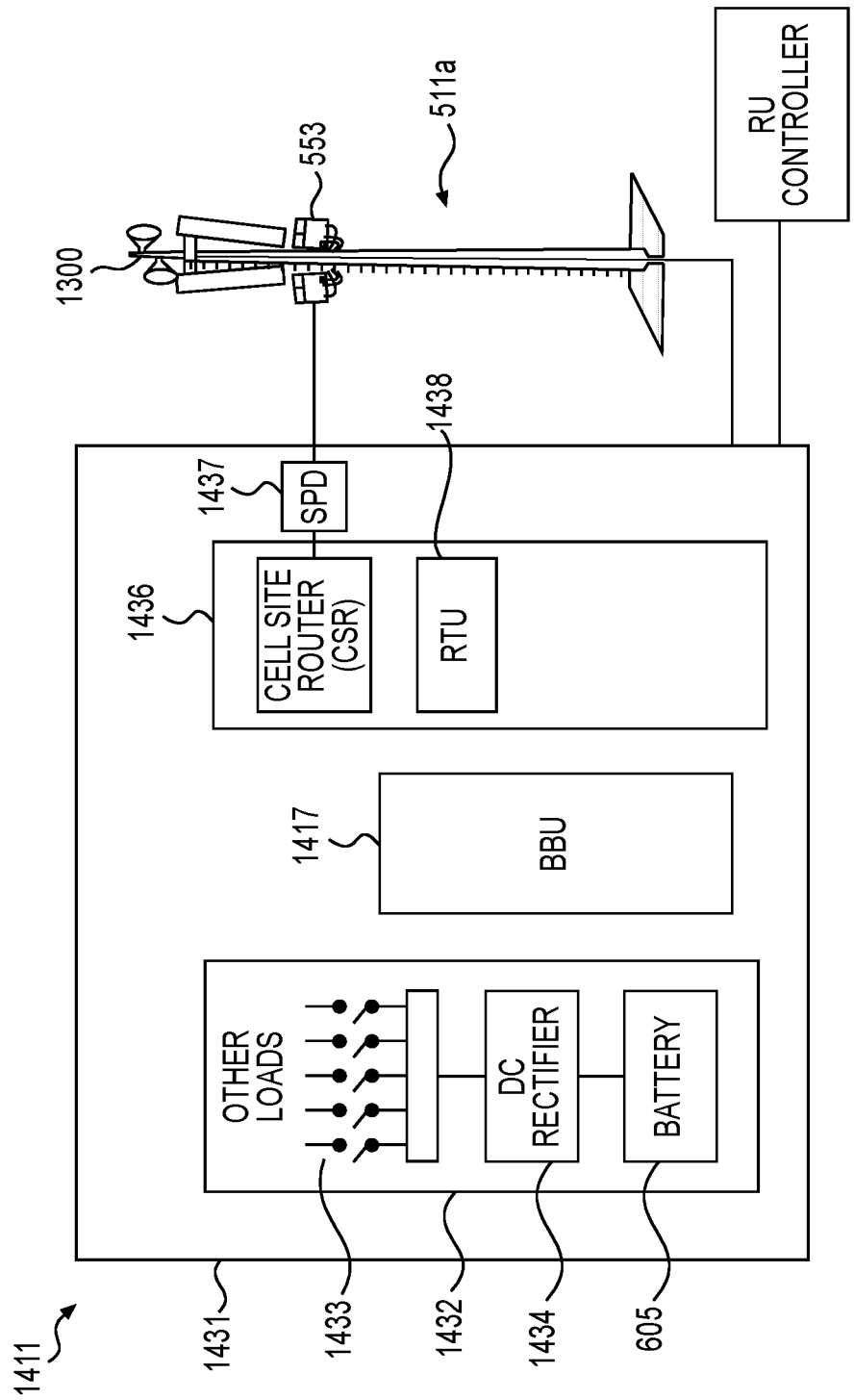
FIG. 14 illustrates a diagram of hardware within a housing of the cell site of FIG. 13.
Figure 15:
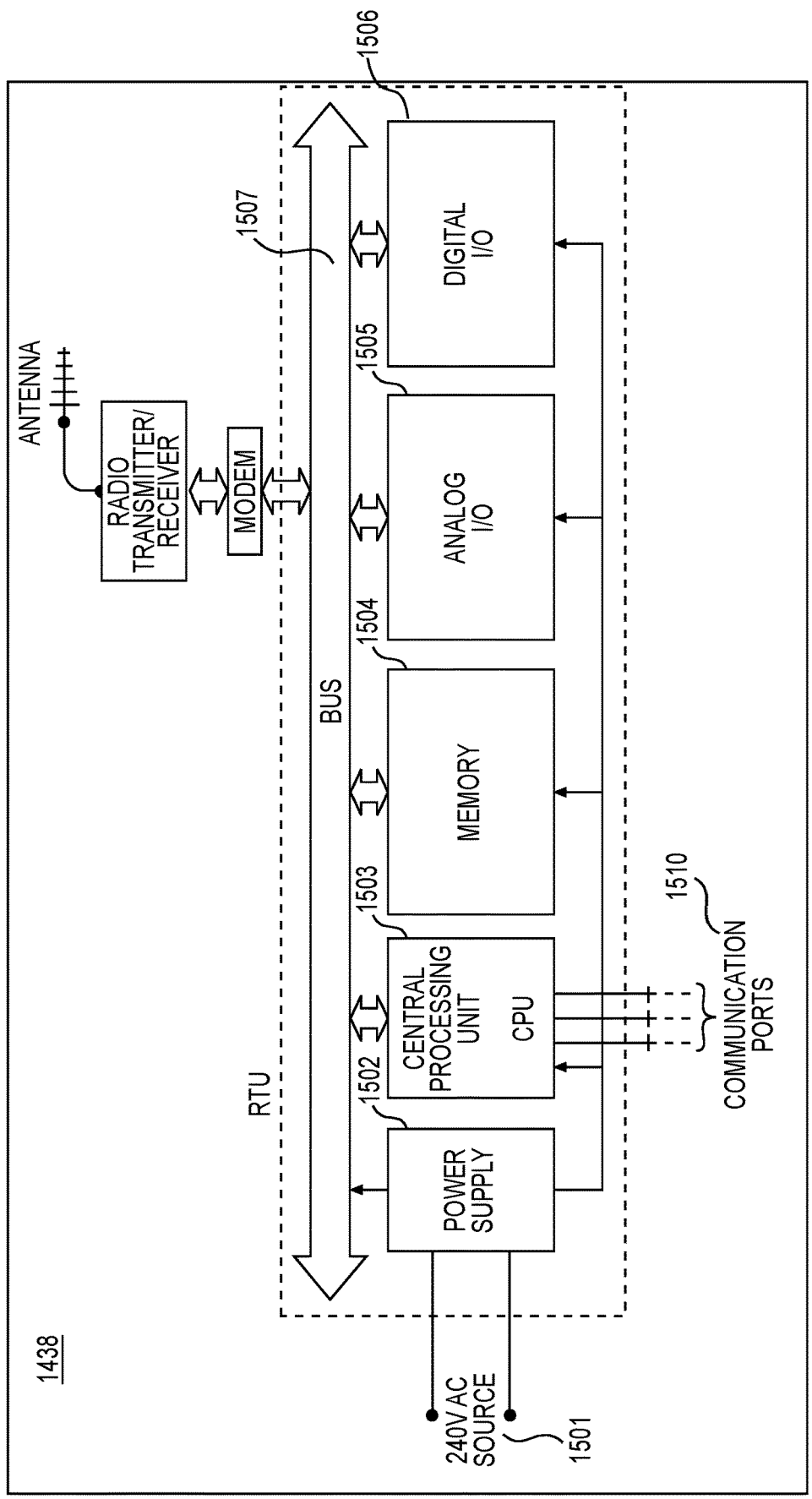
FIG. 15 illustrates a diagram showing components of a remote terminal unit housed within the cell site of FIG. 13.

The hardware and software configurations of the cellular network are described above. FIGS. 13-15 and the passages below describe the detailed configuration of the cellular base stations that provide cellular service within the cellular network.

FIG. 13 is a detailed view of the hardware provided within the exemplary macrosite 410a. In a macrosite, the RU device or RRU 553 is mounted on a cell tower 511a that is higher than the surrounding buildings or terrain to avoid obstruction to signals transmitted to and received from the macrosite. In other words, cell tower 511a elevates antenna 1300 so that it can transmit over terrestrial obstacles.

FIG. 14 is a detailed view of the hardware and software provided within the exemplary macrosite 410a. Referring to FIG. 14, each macrosite 410a is a subset of the cell site 110, and can be implemented as or include an RAN base station 1411, which is a cellular-enabled (including 5G enabled) mobile device site where antennas 1300 and electronic communications equipment are placed to create a cell, or adjacent cells, in the cellular network. The basic structure of the RAN base station 1411 includes a baseband unit (BBU) 1417, a radiofrequency processing unit (i.e., a radio unit (RU) device) 553, one or more antennas 1300, and software-based interfaces, described in more detail later.

The RAN base station 1411 is a RAN element that performs radio transmission and reception in one or more cells to or from the user equipment. Specifically, the RAN base station 1411 includes a tower 511a, and provides signals to the user equipment (e.g., some or all of the UE1-UE3 in FIG. 5, and others), and wirelessly interfaces the user equipment to the RAN infrastructure. The RAN base station 1411 can have an integrated antenna, or as shown in FIG. 13, can have a connection to the antenna 1300 by feeder cables. In the exemplary macrosite 410a illustrated in FIG. 13, the RAN base station 1411 includes: an antenna-feeder system, which has one or more antennas 1300 mounted to the tower 511a or mast; one or more RU devices such as RRU 553 mounted on the cell tower 511a or mast; a BBU 1417; and a support system consisting of various other types of equipment, as described in more detail below.

The support system of the RAN base station 1411 may include elements such as an air conditioner, power supplies, modems or routers, surge protector, remote terminal unit (RTU) device, and other equipment (not shown). As shown in FIG. 14, for example, in addition to the BBU 1417, enclosed within equipment housing 1431 are: a power supply 1432, which includes a DC rectifier 1434 and, in some cases, an auxiliary power unit. In some examples, the auxiliary power unit is implemented as at least one backup battery 605. As described in further detail herein, some, but not all, macrosites within the network may include such an auxiliary power unit.

The equipment housing 1431 may also house switches 1433, which provide connectivity between the power supply 1432 and equipment on the cell site requiring power; a cell site router (CSR) 1436, which provides connectivity between the RAN and the 5G core network by aggregating traffic from the BBU and then backhauling the traffic over an aggregation network to the core network; a surge protective device (SPD) 1437 for providing lightning and surge protection for the base station and cell sites; and a remote terminal unit (RTU) device 1438.

The RTU device 1438 is a control device that monitors, controls, and automates multiple variables and field devices at the base station. Such field devices may include actuators, sensors, and any other supporting equipment housed at the base station. An exemplary RTU device 1438 is shown in the diagram of FIG. 15. As illustrated, the RTU device 1438 includes: a power supply 1502, which is supplied by a power source 1501; one or more central processing units (CPU) 1503; communication ports 1510; a memory 1504, which includes volatile and non-volatile memory; analog input/output modules 1505; and digital input/output modules 1506, where the digital input modules capture status and alarm signals coming from field devices, and the digital output modules send signals and commands to the field devices. The RTU device 1438 interfaces with the field devices via a bus 1507.

Harvesting Control Data and Improvement to Network

After a period of using the management program to control the cellular base stations, data is collected concerning the network changes over time. Based on this, the management program determines an optimal adjustment to operational parameters of the network. This optimization can be improved by using machine learning combined with the operating data collected from the servers on the network. By keeping the operating data it will be known what resource are working resources what resources are down. That facilitates troubleshooting the problematic areas of the network further. Using detailed operating data over time, machine learning and artificial intelligence may be used to predict network behavior in the future.

Embodiments of the cell site, network, system, and method described herein improve the functioning of a computer network (i.e. cellular network) by providing superior collection and handling of network operating data. To do this, the various embodiments use analysis techniques limited to the realm of computer technology, such as machine learning, cellular communications, and cloud computing. Moreover, the cell site, network, system, and method use computer hardware such as servers and network communication hardware, including hardware specialized for cellular communication. Finally, the problem of managing huge volumes of data is a problem limited to the realm of computer networks, as these servers are operating on a computer network. The improvement of network management improves the operation of the computer network itself. Thus, embodiments herein are necessarily rooted in computer technology in order to overcome a problem specifically arising in the realm of computer networks.

This problem is also necessarily rooted in computer technology because of the complexity of managing large volumes of data on a cloud computing network. Because huge volumes of data are being continually generated, this data is very difficult to manage and analyze. Such data management issues can only exist in the realm of computer networks. Moreover, by properly managing and analyzing this data, the performance of the network (and the data speeds and reliability provided to the users) can be improved. An accurate understanding of the network gained from proper operating data collection allows the network controller to exploit all available resources and divert communications away from overburdened or unavailable resources.

In some embodiments, the management program monitors traffic (i.e. cellular data transmission) through the small cells, microcells, and macro cells, and determines which has the largest impact on network data transmission. Or similarly, the management program determines which cells have an impact above a predetermined threshold. Based on this information, the management program can monitor these cells more closely. For example, if the management program learns that in an area where a small cell overlaps a macro cell, and the small cell is performing more data transmission, the program will monitor the small cell more closely for changes in available resources. The management program can also adapt its management protocol to more aggressively change the operational parameters of the small cell and optimize network performance. Similarly, the management program can identify which cells are handling traffic above a given threshold, and more closely monitor those cells.

As will be appreciated by one skilled in the art, aspects of the present disclosure may be embodied as a system, a method or a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a radio access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

Although the invention has been described with reference to embodiments herein, those embodiments do not limit the scope of the invention. Modifications to those embodiments or different embodiments may fall within the scope of the invention.

What is claimed is:

1. A cellular network comprising:
   radio access network (RAN) nodes where each RAN node includes (i) a central unit (CU) that resides on a public cloud of the cellular network, (ii) a distributed unit (DU) that resides on a private cloud of the cellular network such that the DU is in communication with the CU on the public cloud of the cellular network, and (iii) a radio unit (RU) under control of the DU;
   network repository functions (NRFs) that are distributed on the cellular network and reside on at least the public cloud of the cellular network where the NRFs control operation of cell sites and local data centers (LDCs) on the cellular network; and
   processors configured to control data collection edge applications residing with the NRFs to:
      receive operating data of at least one cell site or LDC from at least one NRF, the operating data comprising data generated by the at least one cell site or LDC as a result of providing cellular data services via the cellular network;
      store the operating data in a memory;
      correct errors in the operating data to obtain corrected operating data by:
         identifying one or more errors in the operating data; and
         replacing erroneous data indicated by the one or more errors with non-erroneous data;
      filter the corrected operating data to obtain filtered operating data;
      format the filtered operating data to obtain formatted operating data that is recognizable to one or more data collection agents or cellular base station management programs; and
      cause the one or more data collection agents to change one or more operational parameters of at least one of a RAN node of the cellular network, NRF of the cellular network, cell site of the cellular network, LDC of the cellular network, or cellular base station management program of the cellular network associated with the data collection edge application by sending the formatted operating data to one or more data collection agents on the cellular network that are configured to receive the formatted operating data from the data collection edge applications.

2. The cellular network of claim 1, wherein the operating data is received from the at least one NRF at regular intervals.

3. The cellular network of claim 1, wherein the filtering includes removing duplicative information from the operating data.

4. The cellular network of claim 1, wherein the filtering further includes:
 determining whether any of the operating data is immaterial based on a predetermined classification; and
 based on a determination that any of the operating data is immaterial, removing the immaterial operating data.

5. The cellular network of claim 1, wherein the formatting includes removing rows and columns in the filtered operating data.

6. The cellular network of claim 1, wherein the filtering includes removing sensitive information from the corrected operating data.

7. The cellular network of claim 6, wherein the sensitive information includes personal identifying information.

8. The cellular network of claim 1, wherein the data collection edge applications operate on the cell sites, and the memory is located at the cell site or an associated LDC.

9. The cellular network of claim 1, wherein each data collection agent is exclusively associated with each respective NRF.

10. The cellular network of claim 1, wherein an artificial intelligence cellular communication management program controlling the RAN nodes adjusts its operational parameters using models of predicted network failures, the models having been developed based on the formatted operating data.

11. A method of collecting operating data on a cellular network using processors configured to control data collection edge applications residing with network repository functions (NRFs), comprising:
 receiving operating data from NRFs at data collection edge applications residing with the NRFs, where the NRFs are distributed on the cellular network such that the NRFs reside on at least a public cloud of the cellular network and the NRFs control operation of cell sites and local data centers (LDCs) on the cellular network, the operating data comprising data generated by the cell sites and LDCs as a result of providing cellular data services;
 storing the operating data in a memory;
 correcting errors in the operating data to obtain corrected operating data by:
  identifying one or more errors in the operating data; and
  removing erroneous data indicated by the one or more errors;
 filtering the corrected operating data to obtain filtered operating data;
 formatting the filtered operating data to obtain formatted operating data that is recognizable to one or more data collection agents or cellular base station management programs; and
 causing the one or more data collection agents to change one or more operational parameters of at least one of a RAN node, NRF, cell site, LDC, or cellular base station management program associated with the data collection edge application by sending the formatted operating data to data collection agents on the cellular network that are configured to receive the formatted operating data from the data collection edge applications,
 wherein the cellular network comprises radio access network (RAN) nodes where each RAN mode includes (i) a central unit (CU) that resides on the public cloud of the cellular network, (ii) a distributed unit (DU) that resides on a private cloud of the cellular network such that the DU is in communication with the CU on public cloud of the cellular network, and (iii) a radio unit (RU) under control of the DU.

12. The method of claim 11, wherein the operating data is received from the NRFs at regular intervals.

13. The method of claim 11, wherein the filtering includes removing duplicative information from the operating data.

14. The method of claim 11, wherein the filtering further includes:
 determining whether any of the operating data is immaterial based on a predetermined classification; and
 based on a determination that any of the operating data is immaterial, removing the immaterial operating data.

15. The method of claim 11, wherein the formatting includes removing rows and columns in the filtered operating data.

16. The method of claim 11, wherein the filtering includes removing sensitive information from the corrected operating data.

17. The method of claim 16, wherein the sensitive information includes personal identifying information.

18. The method of claim 11, wherein the control data collection edge applications operate on the cell sites, and the memory is located at the cell sites or the LDCs.

19. The method of claim 11, wherein each data collection agent is exclusively associated with each respective NRF.

20. The method of claim 11, wherein an artificial intelligence cellular communication management program controlling the RAN nodes adjusts its operational parameters using models of predicted network failures, the models having been developed based on the formatted operating data.

* * * * *